(12) United States Patent
Nagata et al.

(10) Patent No.: US 12,735,259 B2
(45) Date of Patent: Sep. 15, 2026

(54) TRANSPORT SYSTEM, CONTROL METHOD, AND NON-TRANSITORY COMPUTER-READABLE MEDIUM COMPRISING CONTROL PROGRAM

(71) Applicant: DMG MORI CO., LTD., Nara (JP)

(72) Inventors: Junya Nagata, Nara (JP); Hiroshi Yahaba, Sapporo (JP)

(73) Assignee: DMG MORI CO., LTD., Nara (JP)

( * ) Notice: Subject to any disclaimer, the term of this patent is extended or adjusted under 35 U.S.C. 154(b) by 452 days.

(21) Appl. No.: 18/276,021

(22) PCT Filed: Sep. 27, 2021

(86) PCT No.: PCT/JP2021/035279
§ 371 (c)(1),
(2) Date: Aug. 5, 2023

(87) PCT Pub. No.: WO2022/168362
PCT Pub. Date: Aug. 11, 2022

(65) Prior Publication Data

US 2024/0116712 A1 Apr. 11, 2024

(30) Foreign Application Priority Data

Feb. 5, 2021 (JP) ................................ 2021-017534

(51) Int. Cl.
*B65G 1/137* (2006.01)
*B23Q 15/22* (2006.01)

(52) U.S. Cl.
CPC ......... *B65G 1/1371* (2013.01); *B23Q 15/225* (2013.01)

(58) Field of Classification Search
CPC ........................... B65G 1/1371; B23Q 15/225
See application file for complete search history.

(56) References Cited

U.S. PATENT DOCUMENTS

2020/0079589 A1* 3/2020 Viswanath ............... B65G 1/12
2020/0324971 A1* 10/2020 Ingram-Tedd ........... B65G 1/04
2024/0001507 A1* 1/2024 Wunderlich ............ B24B 51/00

FOREIGN PATENT DOCUMENTS

JP H02-250105 A 10/1990
JP H09-174371 A 7/1997
(Continued)

OTHER PUBLICATIONS

Gregory Levitin, A genetic algorithm for robotic assembly line balancing, 2006, p. 811-812 (Year: 2006).*

*Primary Examiner* — Ibrahim N El-Bathy
(74) *Attorney, Agent, or Firm* — IP Business Solutions, LLC.

(57) ABSTRACT

Provided is a technique for improving the transport efficiency of workpieces by a transport system compared to before. A transport system of workpiece includes a transport device, a storage, which is one of transport destinations of workpiece by the transport device, a work station, which is one of transport destinations of workpiece by the transport device, a machine tool, which is one of transport destinations of workpiece by the transport device, and a controller. The controller executes a processing of acquiring a first weight of a workpiece to be transported to the storage from the work station, and a processing of determining a storage destination inside the storage for the workpiece to be transported based on the first weight, and the storage destination is determined so as to be closer to the machine tool as the first weight increases.

6 Claims, 21 Drawing Sheets

(56) References Cited

FOREIGN PATENT DOCUMENTS

| | | | |
|---|---|---|---|
| JP | 2004091080 | A | 3/2004 |
| JP | 2010254433 | A | 11/2010 |

* cited by examiner

| KIND OF WORKPIECE | NUMBER |
| --- | --- |
| WORKPIECE WA | 1 |
| WORKPIECE WB | 1 |
| WORKPIECE WC | 2 |
| WORKPIECE WD | 3 |
| ⋮ | ⋮ |

MACHINING ORDER

| KIND OF WORKPIECE | MACHINING PROGRAM | WEIGHT | MACHINING TIME (MIN) | ... |
|---|---|---|---|---|
| WORKPIECE WA | PROGRAM A | w1 | 15 | ... |
| WORKPIECE WB | PROGRAM B | w2 | 20 | ... |
| WORKPIECE WC | PROGRAM C | w3 | 25 | ... |
| WORKPIECE WD | PROGRAM C | w4 | 35 | ... |
| ⋮ | ⋮ | ⋮ | ⋮ | ⋮ |

10
50
100
CONTROLLER SYSTEM
150
CONTROL PANEL
500
WORK STATION
PL4
U
W
331
PL4
335
400
MACHINE TOOL
PL4
W4
300
TRANSPORT DEVICE
330
200
STORAGE PORTION
PL1
PL2
PL3
PL4
PL5
PL6
PL7
PL8
PL9
P1
P2
P3
P4
P5
P6
P7
P8
P9
P10

| STORAGE LOCATION | WEIGHT RANGE | COORDINATES | PALLET | WORKPIECE |
|---|---|---|---|---|
| P1 | $\Delta w1$ | x1, y1, z1 | PL1 | — |
| P2 | $\Delta w2$ (UPPER LIMIT VALUE OF $\Delta w2 < $ LOWER LIMIT OF $\Delta w1$) | x2, y2, z2 | PL2 | — |
| P3 | $\Delta w3$ (UPPER LIMIT VALUE OF $\Delta w3 < $ LOWER LIMIT OF $\Delta w2$) | x3, y3, z3 | PL3 | WORKPIECE WA |
| P4 | $\Delta w4$ (UPPER LIMIT VALUE OF $\Delta w4 < $ LOWER LIMIT OF $\Delta w3$) | x4, y4, z4 | — | — |
| P5 | $\Delta w5$ (UPPER LIMIT VALUE OF $\Delta w5 < $ LOWER LIMIT OF $\Delta w4$) | x5, y5, z5 | PL5 | — |
| P6 | $\Delta w6$ (UPPER LIMIT VALUE OF $\Delta w6 < $ LOWER LIMIT OF $\Delta w5$) | x6, y6, z6 | PL6 | — |
| P7 | $\Delta w7$ (UPPER LIMIT VALUE OF $\Delta w7 < $ LOWER LIMIT OF $\Delta w6$) | x7, y7, z7 | PL7 | — |
| P8 | $\Delta w8$ (UPPER LIMIT VALUE OF $\Delta w8 < $ LOWER LIMIT OF $\Delta w7$) | x8, y8, z8 | PL8 | — |
| P9 | $\Delta w9$ (UPPER LIMIT VALUE OF $\Delta w9 < $ LOWER LIMIT OF $\Delta w8$) | x9, y9, z9 | PL9 | — |
| P10 | $\Delta w10$ (UPPER LIMIT VALUE OF $\Delta w10 < $ LOWER LIMIT OF $\Delta w9$) | x10, y10, z10 | — | — |

10
50
100
CONTROLLER SYSTEM
150
CONTROL PANEL
500
WORK STATION
HEAVY WORKPIECE
PL1
WB
U
335
331
PL1
400
MACHINE TOOL
PL4
WA
(NOW MACHINING)
300
TRANSPORT DEVICE
330
200
STORAGE PORTION
PL1
PL2
PL3
PL5
PL6
PL7
PL8
PL9
P1
P2
P3
P4
P5
P6
P7
P8
P9
P10

10
50
100
CONTROLLER SYSTEM
150
CONTROL PANEL
151
PLC
NW1
NW2
61
REMOTE I/O UNIT
62
REMOTE I/O UNIT
63
REMOTE I/O UNIT
72
71A 71B 71C 71D
300
TRANSPORT DEVICE
335
SERVO DRIVER
400
MACHINE TOOL
401
CNC
550
OPERATION TERMINAL

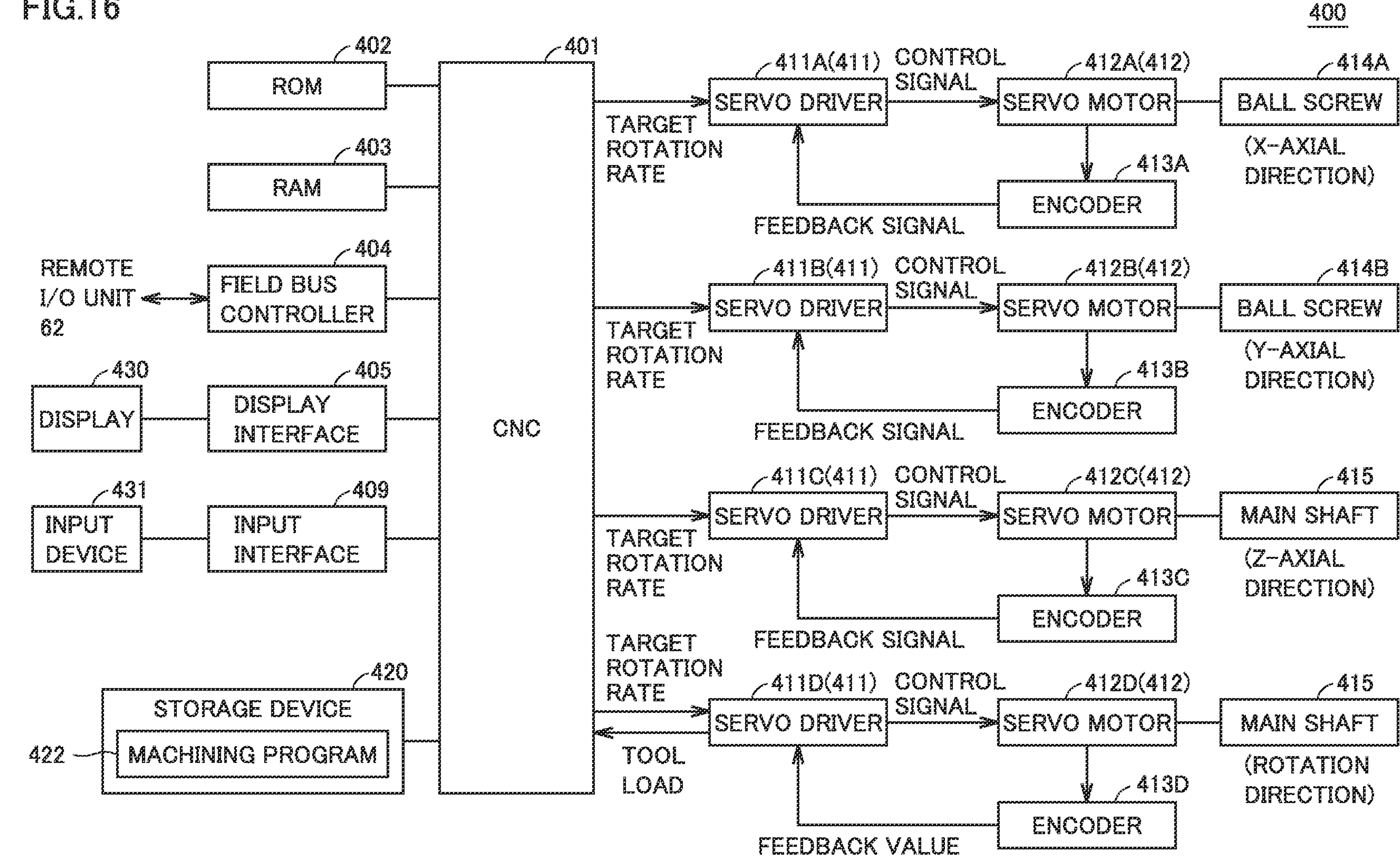
FIG.16
400
ROM
402
RAM
403
REMOTE I/O UNIT 62
FIELD BUS CONTROLLER
404
DISPLAY
430
DISPLAY INTERFACE
405
INPUT DEVICE
431
INPUT INTERFACE
409
STORAGE DEVICE
420
MACHINING PROGRAM
422
CNC
401
TARGET ROTATION RATE
411A(411)
SERVO DRIVER
CONTROL SIGNAL
412A(412)
SERVO MOTOR
414A
BALL SCREW
(X-AXIAL DIRECTION)
413A
ENCODER
FEEDBACK SIGNAL
TARGET ROTATION RATE
411B(411)
SERVO DRIVER
CONTROL SIGNAL
412B(412)
SERVO MOTOR
414B
BALL SCREW
(Y-AXIAL DIRECTION)
413B
ENCODER
FEEDBACK SIGNAL
TARGET ROTATION RATE
411C(411)
SERVO DRIVER
CONTROL SIGNAL
412C(412)
SERVO MOTOR
415
MAIN SHAFT
(Z-AXIAL DIRECTION)
413C
ENCODER
FEEDBACK SIGNAL
TARGET ROTATION RATE
TOOL LOAD
411D(411)
SERVO DRIVER
CONTROL SIGNAL
412D(412)
SERVO MOTOR
415
MAIN SHAFT
(ROTATION DIRECTION)
413D
ENCODER
FEEDBACK VALUE

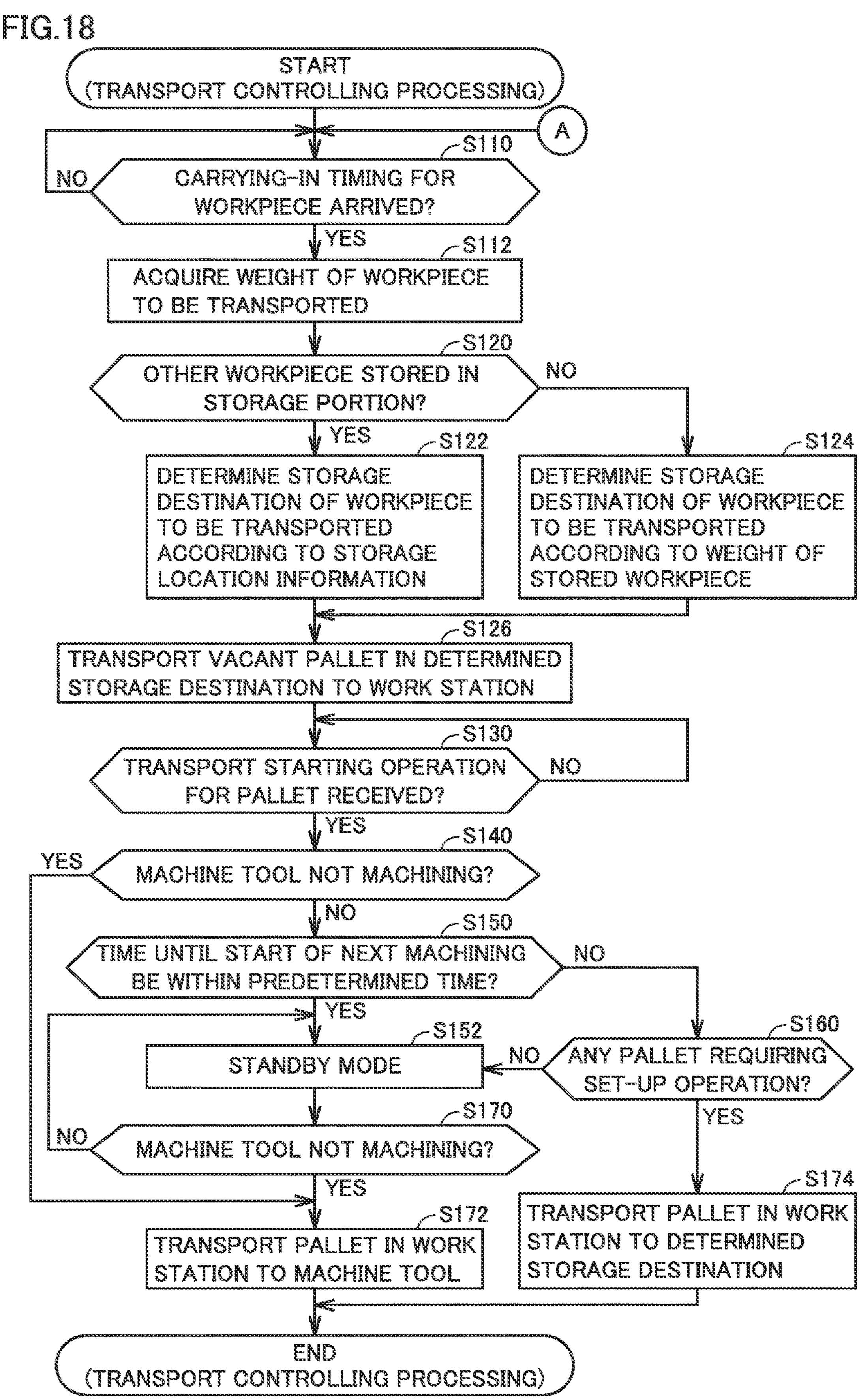
FIG.18
START
(TRANSPORT CONTROLLING PROCESSING)
A
S110
NO
CARRYING-IN TIMING FOR WORKPIECE ARRIVED?
YES
S112
ACQUIRE WEIGHT OF WORKPIECE TO BE TRANSPORTED
S120
OTHER WORKPIECE STORED IN STORAGE PORTION?
NO
YES
S122
DETERMINE STORAGE DESTINATION OF WORKPIECE TO BE TRANSPORTED ACCORDING TO STORAGE LOCATION INFORMATION
S124
DETERMINE STORAGE DESTINATION OF WORKPIECE TO BE TRANSPORTED ACCORDING TO WEIGHT OF STORED WORKPIECE
S126
TRANSPORT VACANT PALLET IN DETERMINED STORAGE DESTINATION TO WORK STATION
S130
TRANSPORT STARTING OPERATION FOR PALLET RECEIVED?
NO
YES
S140
YES
MACHINE TOOL NOT MACHINING?
NO
S150
TIME UNTIL START OF NEXT MACHINING BE WITHIN PREDETERMINED TIME?
NO
YES
S152
STANDBY MODE
NO
S160
ANY PALLET REQUIRING SET-UP OPERATION?
YES
S170
NO
MACHINE TOOL NOT MACHINING?
YES
S172
TRANSPORT PALLET IN WORK STATION TO MACHINE TOOL
S174
TRANSPORT PALLET IN WORK STATION TO DETERMINED STORAGE DESTINATION
END
(TRANSPORT CONTROLLING PROCESSING)

10
50
100
CONTROLLER SYSTEM
150
CONTROL PANEL
500
WORK STATION
U
PL1
WB
331
335
400
MACHINE TOOL
PL4
WA
(NOW MACHINING)
300
TRANSPORT DEVICE
330
200
STORAGE PORTION
PL1
PL2
PL3
PL5
PL6
PL7
PL8
PL9
P1
P2
P3
P4
P5
P6
P7
P8
P9
P10
AR1
AR2

200
STORAGE PORTION
ST2
ST1 (PRIORITY)
P11
P12
P13
P14
P15
P16
P17
P18
P19
P20
PL11
PL12
PL13
PL14
PL15
PL16
PL17
PL18
PL19
PL20
W1
W2
W9
W10
PL1
PL2
PL3
PL4
PL5
PL6
PL7
PL8
PL9
PL10
P1
P2
P3
P4
P5
P6
P7
P8
P9
P10
MACHINE TOOL SIDE
WORK STATION SIDE

TRANSPORT SYSTEM, CONTROL METHOD, AND NON-TRANSITORY COMPUTER-READABLE MEDIUM COMPRISING CONTROL PROGRAM

TECHNICAL FIELD

The present disclosure relates to transport control of workpieces in a transport system.

BACKGROUND ART

A transport system that sequentially transports workpieces to be machined based on a preliminarily set schedule is known. Regarding the transport system, PTL 1 (Japanese Patent Laying-Open No. 09-174371) discloses "A pallet pool type machining device capable of improving the flexibility and expandability in design and production and reducing the costs at the time of new construction of a device responding to user's requests, at the time of additional extension of the equipment, and at the time of changing the arrangement" (see "ABSTRACT").

CITATION LIST

Patent Literature

PTL 1: Japanese Patent Laying-Open No. 09-174371

SUMMARY OF INVENTION

Technical Problem

A transport system is configured by a work station, a machine tool, a storage for workpiece, and so on. A worker sets a workpiece to be machined in the work station. Then, the workpiece is stored in a storage for workpiece. On arrival of the machining timing for the workpiece, the workpiece is transported from the storage to the machine tool. Upon completion of machining of the workpiece, the workpiece is transported to the storage or the work station.

In order to raise the productivity of workpieces, it is desired to improve the transport efficiency of workpieces by the transport system. The transport system disclosed in PTL 1 does not aim at improving the transport efficiency of workpieces.

The present disclosure was devised to solve the problem described above, and an object in a certain aspect is to provide a technique for improving the transport efficiency of workpieces by the transport system compared to before.

Solution to Problem

In one example of the present disclosure, a transport system for a workpiece, comprising: a transport device for transporting a workpiece to be machined; a storage, which is one of transport destinations of workpiece by the transport device, capable of storing a plurality of workpieces; a work station, which is one of transport destinations of workpiece by the transport device, for a worker to perform work for workpiece; a machine tool, which is one of transport destinations of workpiece by the transport device, for machining a workpiece; and a controller for controlling the transport system. The controller executes: a processing of acquiring a first weight of a workpiece to be transported from the work station to the storage; and a processing of determining a storage destination inside the storage for the workpiece to be transported based on the first weight. The storage destination is determined so as to be closer to the machine tool as the first weight increases.

In one example of the present disclosure, the controller further executes a processing of acquiring a second weight of a workpiece stored in the storage. In the processing of determining, when the first weight is heavier than the second weight, the storage destination is determined so as to be closer to the machine tool than the storage location of the stored workpiece. When the first weight is lighter than the second weight, the storage destination is determined so as to be farther from the machine tool than the storage location of the stored workpiece.

In one example of the present disclosure, the storage includes a first storage area and a second storage area. The first storage area is closer to the machine tool than the second storage area. In the processing of determining, when the first weight is heavier than a predetermined weight, the storage destination is determined from within the first storage area. When the first weight is lighter than the predetermined weight, the storage destination is determined from within the second storage area.

In one example of the present disclosure, the storage includes a first stage, and a second stage that is an upper stage than the first stage. In the processing of determining, when there is vacancy in the first stage, the storage destination is determined from within the first stage based on the first weight. When there is no vacancy in the first stage, the storage destination is determined from within the second stage based on the first weight.

In one example of the present disclosure, the transport system further includes an operation panel capable of receiving designation of a workpiece for which the machining order have priority over other workpieces. Furthermore, upon reception of the designation, the controller executes the processing of determining a storage destination inside the storage regardless of weight of the workpiece having priority. The storage destination is a storage location that is still closer to the machine tool among storage locations inside the storage.

In one example of the present disclosure, the transport device transports the workpiece to be transported to the storage destination while the machine tool machines other workpiece than the workpiece to be transported.

In other example of the present disclosure, there is provided a control method of a transport system. The transport system comprising: a transport device for transporting a workpiece to be machined; a storage, which is one of transport destinations of workpiece by the transport device, capable of storing a plurality of workpieces; a work station, which is one of transport destinations of workpiece by the transport device, for a worker to perform work for workpiece; and a machine tool, which is one of transport destinations of workpiece by the transport device, for machining a workpiece. The control method comprising: acquiring weight of a workpiece to be transported from the work station to the storage; and determining a storage destination inside the storage for the workpiece to be transported based on the weight. The storage destination is determined so as to be closer to the machine tool as the weight increases.

In other example of the present disclosure, there is provided a control program of a transport system. The transport system comprising: a transport device for transporting a workpiece to be machined; a storage, which is one of transport destinations of workpiece by the transport device, capable of storing a plurality of workpieces; a work station, which is one of transport destinations of workpiece by the transport device, for a worker to perform work for workpiece; and a machine tool, which is one of transport destinations of workpiece by the transport device, for machining a workpiece. The control program causes the transport system to execute: acquiring weight of workpiece to be transported from the work station to the storage; and determining a storage destination inside the storage for the workpiece to be transported based on the weight, the storage destination is determined so as to be closer to the machine tool as the weight increases.

The foregoing and other objects, features, aspects and advantages of the present disclosure will become more apparent from the following detailed description of the present disclosure when taken in conjunction with the accompanying drawings.

BRIEF DESCRIPTION OF DRAWINGS

FIG. 4 is a chart showing one example of data structure of a machining setting.

FIG. 5 is a chart showing one example of data structure of workpiece information.

FIG. 9 is a chart showing one example of data structure of storage location information.

FIG. 16 is a block diagram showing principal hardware configuration of the machine tool.

FIG. 18 is a flowchart showing part of a transport processing executed by a processor.

DESCRIPTION OF EMBODIMENTS

Figure 1:
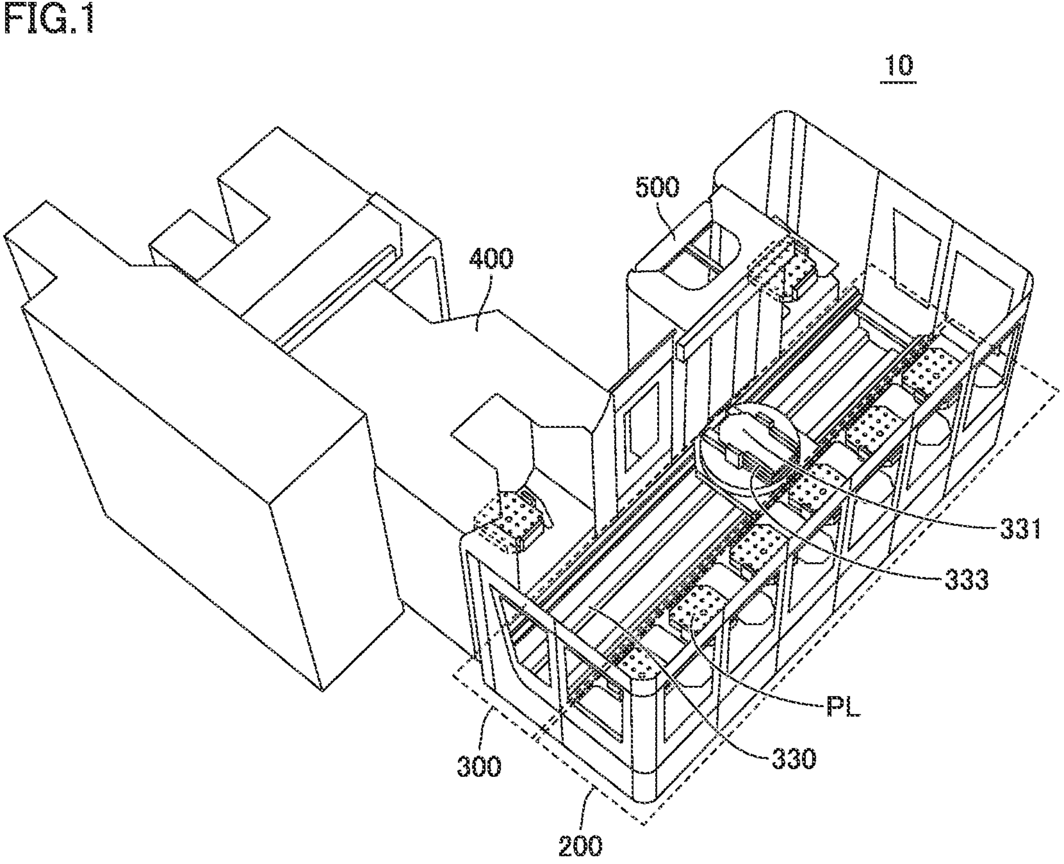
FIG. 1 is a view showing an appearance of a transport system.

Hereinafter, each embodiment based on the present invention will be described by referring to the drawings. In the following description, the same parts and constituents are denoted by the same reference numeral. The names and functions of these are also the same. Therefore, detailed description is not repeated for these.

Each embodiment and each modified example described below may be appropriately and selectively combined.

A. Appearance of Transport System 10

Referring to FIG. 1, a transport system 10 is described. FIG. 1 is a view showing an appearance of transport system 10.

As shown in FIG. 1, transport system 10 includes one or more storage 200, one or more transport device 300, one or more machine tool 400, and one or more work station 500.

Storage portion 200 is one of transport destinations of workpiece by transport device 300. In storage 200, a plurality of pallets PL can be stored. Pallet PL is configured to allow attachment of a workpiece. In storage 200, a vacant pallet on which no workpiece is placed, a pallet on which a workpiece before machining is placed, a pallet on which a workpiece under machining is placed, a pallet on which a machined workpiece is placed, and so on are stored.

Transport device 300 transports designated pallet PL to a designated place. More specifically, transport device 300 includes a rail 330 and a carriage 331. Carriage 331 is configured to be movable along rail 330, for example, by a later-described servo motor 335 (see FIG. 2). Also, carriage 331 has a fork portion 333 that is configured to be driven in a direction orthogonal to rail 330 (namely, the direction orthogonal to the traveling direction of carriage 331). Carriage 331 moves along rail 330 to the position of pallet PL to be transported, and places pallet PL to be transported on carriage 331 by using fork portion 333. Thereafter, carriage 331 moves along rail 330 to a designated transport destination, and carries pallet PL to be transported into the transport destination using fork portion 333.

Machine tool 400 is one of transport destinations of pallet PL by transport device 300. Machine tool 400 machines a workpiece attached to carried-in pallet PL based on a preliminarily designed machining program. Upon completion of machining of the workpiece, pallet PL in machine tool 400 is transported to storage 200 or work station 500 by transport device 300.

Work station 500 is one of transport destinations of pallet PL by transport device 300. In work station 500, a worker performs various works for carried-in pallet PL. As one example, in work station 500, a worker carries out a work of attaching a workpiece to be machined to carried-in pallet PL, a work of detaching a machined workpiece from pallet PL, and so on. Upon completion of the works for pallet PL, the worker performs an operation for indicating completion of works. Based on this, pallet PL in work station 500 is transported to storage 200 or machine tool 400 by transport device 300.

B. Device Configuration of Transport System 10

Figure 2:
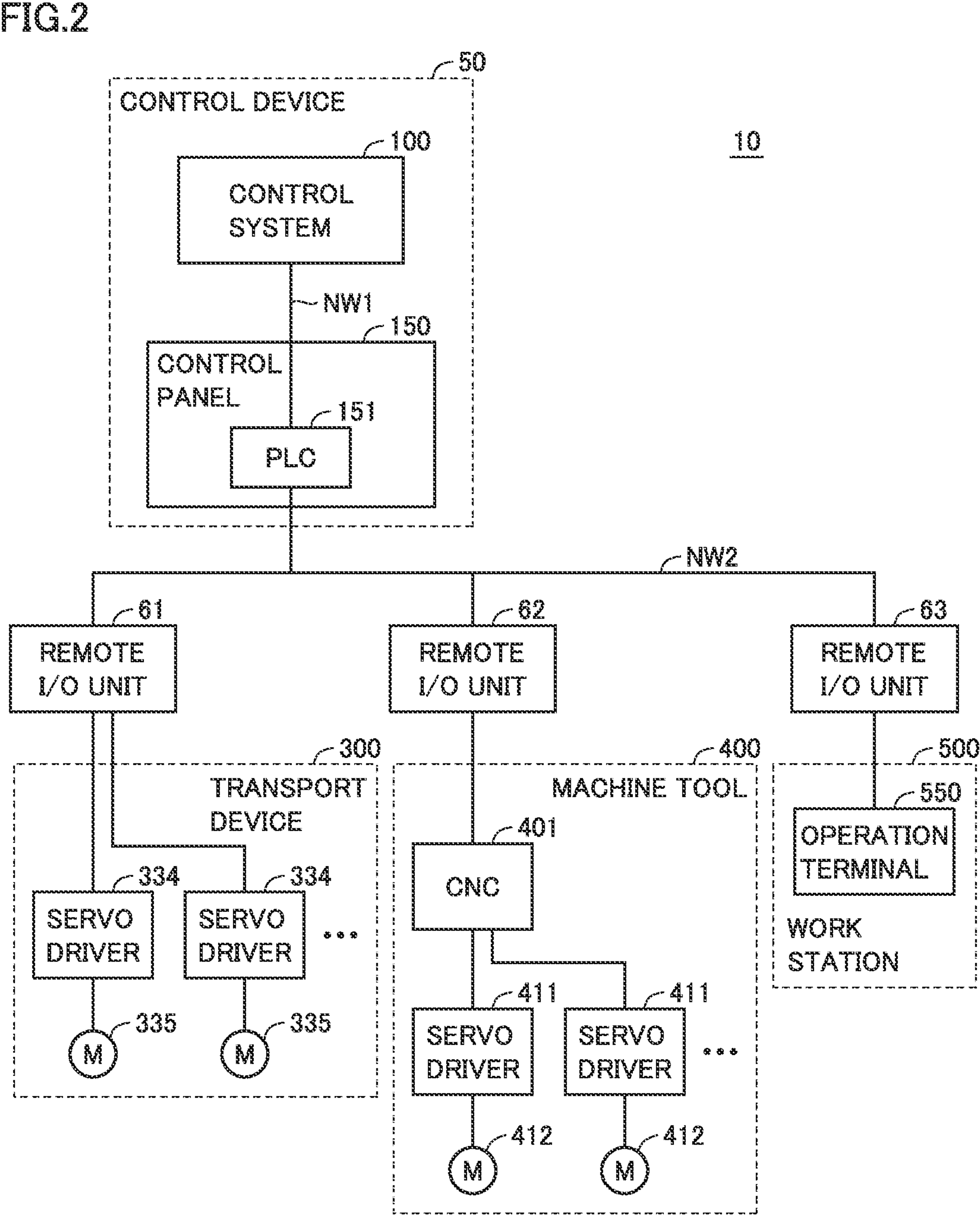
FIG. 2 is a diagram showing one example of device configuration of the transport system.

FIG. 2 is a diagram showing one example of device configuration of transport system 10. Referring to FIG. 2, one example of device configuration of transport system 10 is described.

As shown in FIG. 2, tool transport system 10 includes a controller 50, remote I/O (Input/Output) units 61 to 63, transport device 300, machine tool 400, and work station 500.

"Controller 50" referred in the present description means a device that controls transport system 10. A device configuration of controller 50 is ad libitum. Controller 50 may be configured by a single control unit and may be configured by a plurality of control units. In the example of FIG. 2, controller 50 is configured by a control system 100 and a control panel 150. Controller 50 may include a CNC 401 that controls machine tool 400, or an operation terminal 550 in work station 500.

Control system 100 is a main computer that controls transport system 10. Control panel 150 controls various industrial devices for automating a machining process. Control panel 150 includes a PLC 151.

Control system 100 and PLC 151 are connected to a network NW1. Control system 100 and PLC 151 may be communication connected by wire and may be communication connected wirelessly. For Network NW1, EtherNET (registered trademark) or the like is employed. Control system 100 sends a control command to PLC 151 via network NW1. According to the control command, pallet PL to be transported, a transport destination of pallet PL, start/stop of transport of pallet PL and the like are designated.

Remote I/O units 61 to 63 and PLC 151 are connected to a network NW2. As network NW2, it is preferred to employ a field network that conducts fixed-cycle communication with which data arrival time is ensured. As such a field network that conducts fixed-cycle communication, for example, EtherCAT (registered trademark), EtherNet/IP (registered trademark), CC-Link (registered trademark), or CompoNet (registered trademark) is employed.

Transport device 300 includes one or more servo driver 334, and one or more servo motor 335. Inside transport device 300 or in the vicinity of transport device 300, remote I/O unit 61 is disposed. Remote I/O unit 61 mediates data exchange between various driving units (for example, servo driver 334) inside transport device 300, and PLC 151. Servo driver 334 receives a control command at a fixed cycle from PLC 151 via remote I/O unit 61, and controls driving of servo motor 335 based on the control command. As one example, one servo motor 335 controls driving of carriage 331 (see FIG. 1) described above, and another servo motor 335 controls driving of fork portion 333 (see FIG. 1) described above.

Servo driver 334 sequentially receives input of target rotation speed (target position) from PLC 151, and controls servo motor 335 so that servo motor 335 rotates at the target rotation speed. More specifically, servo driver 334 calculates an actual rotation speed (or actual position) of servo motor 335 from a feedback signal of an encoder (not shown) for servo motor 335, and servo driver 334 increases the rotation speed of servo motor 335 when the actual rotation speed is smaller than the target rotation speed, and decreases the rotation speed of servo motor 335 when the actual rotation speed is larger than the target rotation speed. In this manner, servo driver 334 approximates the rotation speed of servo motor 335 to the target rotation speed while sequentially receiving feedback of rotation speed of servo motor 335. As a result, transport device 300 can move pallet PL to any transport destination.

Machine tool 400 includes a CNC (Computer Numerical Control) 401, a servo driver 411, and a servo motor 412. Inside machine tool 400 or in the vicinity of machine tool 400, remote I/O unit 62 is disposed. Remote I/O unit 62 mediates data exchange between various driving units (for example, CNC 401) inside machine tool 400, and PLC 151. Likewise servo driver 334, servo driver 411 receives a control command at a fixed cycle from PLC 151 via remote I/O unit 62, and controls driving of servo motor 412 based on the control command.

Work station 500 includes operation terminal 550 that receives an operation by a worker. Inside work station 500 or in the vicinity of work station 500, remote I/O unit 63 is disposed. Remote I/O unit 63 mediates data exchange between operation terminal 550 and PLC 151. The operation content by the worker on operation terminal 550 is sent to PLC 151 via remote I/O unit 63 at a fixed cycle.

C. Outline

Next, referring to FIG. 1 described above, transport control for workpiece by transport system 10 is described.

Transport system 10 transports a workpiece that is to be machined next from work station 500 to storage 200 while machine tool 400 is machining a workpiece. The workpiece that is to be machined next stands by until machining in machine tool 400 ends. Thereafter, on the basis of end of machining of workpiece by machine tool 400, the workpiece that is to be machined next is transported from storage 200 to machine tool 400.

The transport time of workpiece by transport device 300 increases as the weight of the workpiece increases. Therefore, the workpiece that is to be machined next is preferably stored close to machine tool 400. This reduces the transport time from storage 200 to machine tool 400.

However, when workpieces are stored sequentially from the place closer to machine tool 400, there is a possibility that a heavy workpiece that is late in the machining order is stored in a place far from machine tool 400. In this case, the transport time increases. For addressing to this, controller 50 of transport system 10 acquires weight of workpiece to be transported to storage 200 from work station 500 (first weight), and determines a storage destination inside storage 200 for the workpiece to be transported based on the weight. The storage destination is determined so as to be closer to machine tool 400 as the weight of the workpiece to be transported increases.

Accordingly, transport system 10 is capable of store a heavier workpiece in a place closer to machine tool 400, resulting that the transport efficiency of workpieces is improved. This results in improvement in productivity of workpieces.

D. Functional Constituents of Controller 50

Figure 3:
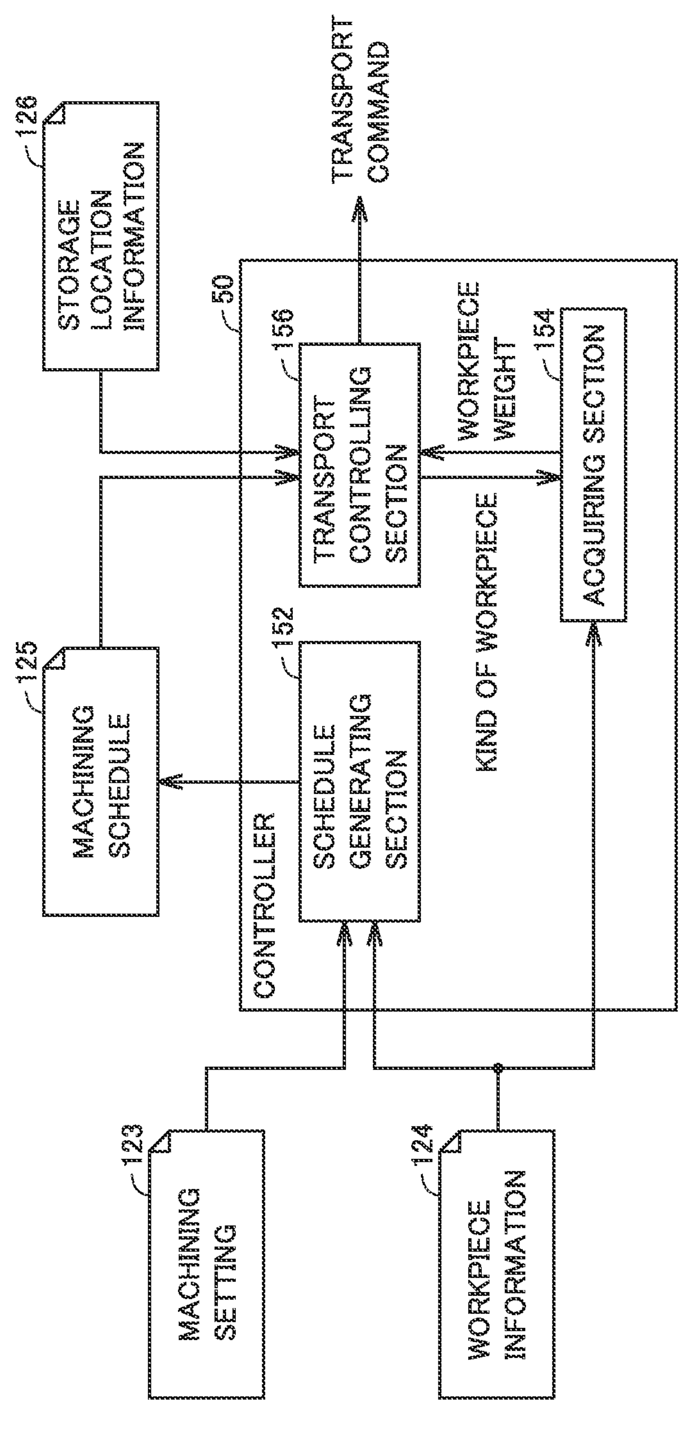
FIG. 3 is a diagram showing one example of functional constituents of the controller.

Referring to FIG. 3 to FIG. 12, function of controller 50 (see FIG. 2.) described above is described. FIG. 3 is a diagram showing one example of functional constituents of controller 50.

As shown in FIG. 3, controller 50 includes, as functional constituents, a schedule generating section 152, an acquiring section 154, and a transport controlling section 156. These functional constituents are implemented in control system 100 or PLC 151 that constitutes controller 50. Alternatively, these functional constituents may be implemented in operation terminal 550.

In a certain aspect, part of schedule generating section 152, transport controlling section 156, and acquiring section 154 is implemented in control system 100, and the remaining functional constituents are implemented in PLC 151. In other aspect, all of schedule generating section 152, transport controlling section 156, and acquiring section 154 are implemented in control system 100. In other aspect, all of schedule generating section 152, transport controlling section 156, and acquiring section 154 are implemented in PLC 151.

(D1. Schedule Generating Section 152)

Figure 6:
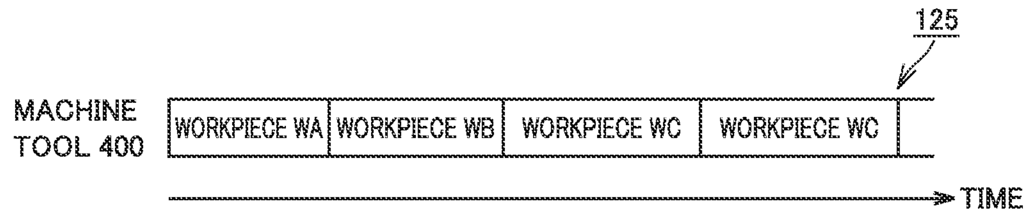
FIG. 6 is a chart showing one example of a machining schedule.

First, referring to FIG. 4 to FIG. 6, functions of schedule generating section 152 shown in FIG. 3 are described.

Schedule generating section 152 generates a machining schedule 125 shown in FIG. 6 based on a machining setting 123 shown in FIG. 4, and workpiece information 124 shown in FIG. 5.

FIG. 4 is a chart showing one example of data structure of machining setting 123. A worker preliminarily registers workpieces to be machined by registering machining setting 123. Machining setting 123 is registered, for example, by the worker in control system 100 described above, or operation terminal 550 described above and the like. Contents registered by the worker include identification information (workpiece name or workpiece ID) of workpieces to be machined, the number of workpieces to be machined, and a machining order of workpieces.

In the example of FIG. 4, machining setting 123 includes a machining task for one workpiece WA for which machining time is 15 minutes, a machining task for one workpiece WB for which machining time is 35 minutes, a machining task for two workpieces WC for which machining time is 25 minutes, and a machining task for three workpieces WD for which machining time is 35 minutes.

FIG. 5 is a chart showing one example of data structure of workpiece information 124. As one example, in workpiece information 124, a machining program for realizing machining of workpiece, weight of workpiece, a machining time required for machining of workpiece, and other information regarding machining of workpiece for each identification information of workpiece.

The machining program defined in workpiece information 124 is registered by a worker, for example, in control system 100 described above, machine tool 400 described above, or operation terminal 550 described above and the like. The method for generating the machining program is ad libitum. As one example, some machine tools 400 have a function of automatically generating a machining program by an operator responding to questions in dialogue form. The machining program is generated, for example, by such a function. Alternatively, the machining program may be designed by the worker writing a program code.

Weight defined in workpiece information 124 may, for example, be preliminarily set by a user, or may be registered, for example, at the time of designing the machining program. As one example, the weight is inputted in operation terminal 550. The weight indicates weight of the workpiece before starting of machining.

The machining time defined in workpiece information 124 is, for example, preliminarily inputted by a worker. Alternatively, the machining time may be calculated from the past actual results of each workpiece.

By referring to workpiece information 124, schedule generating section 152 specifies a machining time for each workpiece defined in machining setting 123. Next, schedule generating section 152 generates machining schedule 125 shown in FIG. 6 based on the specified machining time, the number of each workpiece defined in machining setting 123, and a machining order of each workpiece defined in machining setting 123.

FIG. 6 is a chart showing machining schedule 125 as one example. In machining schedule 125, a machining task of workpiece in each of machine tools 400 is defined. Machining schedule 125 generated by schedule generating section 152 may be stored in a storage device of transport system 10 or may be outputted to transport controlling section 156.

(D2. Acquiring Section 154)

Next, referring to the above FIG. 5, function of acquiring section 154 shown in FIG. 3 is described.

Acquiring section 154 acquires weight of a workpiece to be transported. Weight of the workpiece to be transported is acquired, for example, from workpiece information 124. As described above, workpiece information 124 defines weight of various kinds of workpieces. On the basis of acquisition of the kind of the workpiece to be transported from transport controlling section 156, acquiring section 154 acquires weight corresponding to the kind of workpiece from workpiece information 124. The acquired weight of workpiece is outputted to transport controlling section 156.

The method for acquiring weight of workpiece is not limited to the above-described method. Weight of workpiece can be acquired in various methods.

In a certain aspect, acquiring section 154 acquires weight of a workpiece to be transported from a weight sensor (not shown). The weight sensor is provided, for example, in each pallet. The weight sensor detects weight of a workpiece on the basis of attachment of the workpiece to a pallet. The weight of workpiece is transmitted, for example, to controller 50.

In other aspect, acquiring section 154 measures weight of a workpiece to be transported using a camera (not shown). The camera is provided, for example, inside work station 500. On the basis that a workpiece is attached inside work station 500, acquiring section 154 sends a photographing instruction to the camera. As a result, acquiring section 154 acquires an image showing a workpiece to be transported.

As a method for detecting weight of a workpiece from an image, various image processes can be used. As one example, weight of a workpiece is measured by using a learned model. The learned model is generated in advance by a learning processing using data set for learning. The data set for learning includes a plurality of images for learning in which a workpiece is seen. Each image for learning is correlated with a label indicating weight of workpiece. An internal parameter of the learned model is optimized in advance by a learning process using such a data set for learning.

In the learning technique for generating the learned model, various machine learning algorithms can be employed. As one example, deep learning, convolution neural network (CNN), fully convolutional neural network (FCN), support vector machine and the like are employed as the machine learning algorithms.

Acquiring section 154 inputs an image obtained from the camera to a learned model. Upon reception of input of an image, the learned model outputs weight of the workpiece in the image. Accordingly, acquiring section 154 acquires weight of a workpiece to be transported. The method for estimating workpiece weight using an image is not limited to above-described method using a learned model, but an image process based on rule base may be employed.

In still other aspect, acquiring section 154 may estimate the weight of workpiece from the motor load on transport device 300. More specifically, the weight of the workpiece increases as the motor load increases.

Since the motor load correlates, for example, with the magnitude of the current value outputted to servo motor 335 of transport device 300 (see FIG. 2), acquiring section 154 detects the motor load on servo motor 335 based on the magnitude of the current value. When servo motor 335 is a three-phase alternating motor, servo motor 335 is controlled via an inverter (not shown). In this case, torque of servo motor 335 is controlled, for example, based on the following formula (1).

$$T = K \times (V/f) \times I \quad (1)$$

"T" in formula (1) represents torque (motor load) of servo motor 335. "K" represents a constant. "V" represents an output voltage value to the inverter. "f" represents an output frequency of the inverter. "I" represents an output current value to the inverter. "K×(V/f)" is a constant value up to a certain frequency (for example, 60 Fz). That is, the motor load varies depending on the output current value "I" of the inverter.

Focusing on this point, acquiring section 154 estimates weight of a workpiece to be transported based on the output current value "I" of the inverter. More specifically, the correlation between magnitude of output current value "I" and weight of workpiece to be transported is preliminarily determined. The correlation may be defined in a table format in which weight of workpiece is associated with different output current values, or may be defined by a correlation formula described by output current value as an explanatory variable, and weight of workpiece as a response variable.

(D3. Transport Controlling Section 156)

Figure 7:
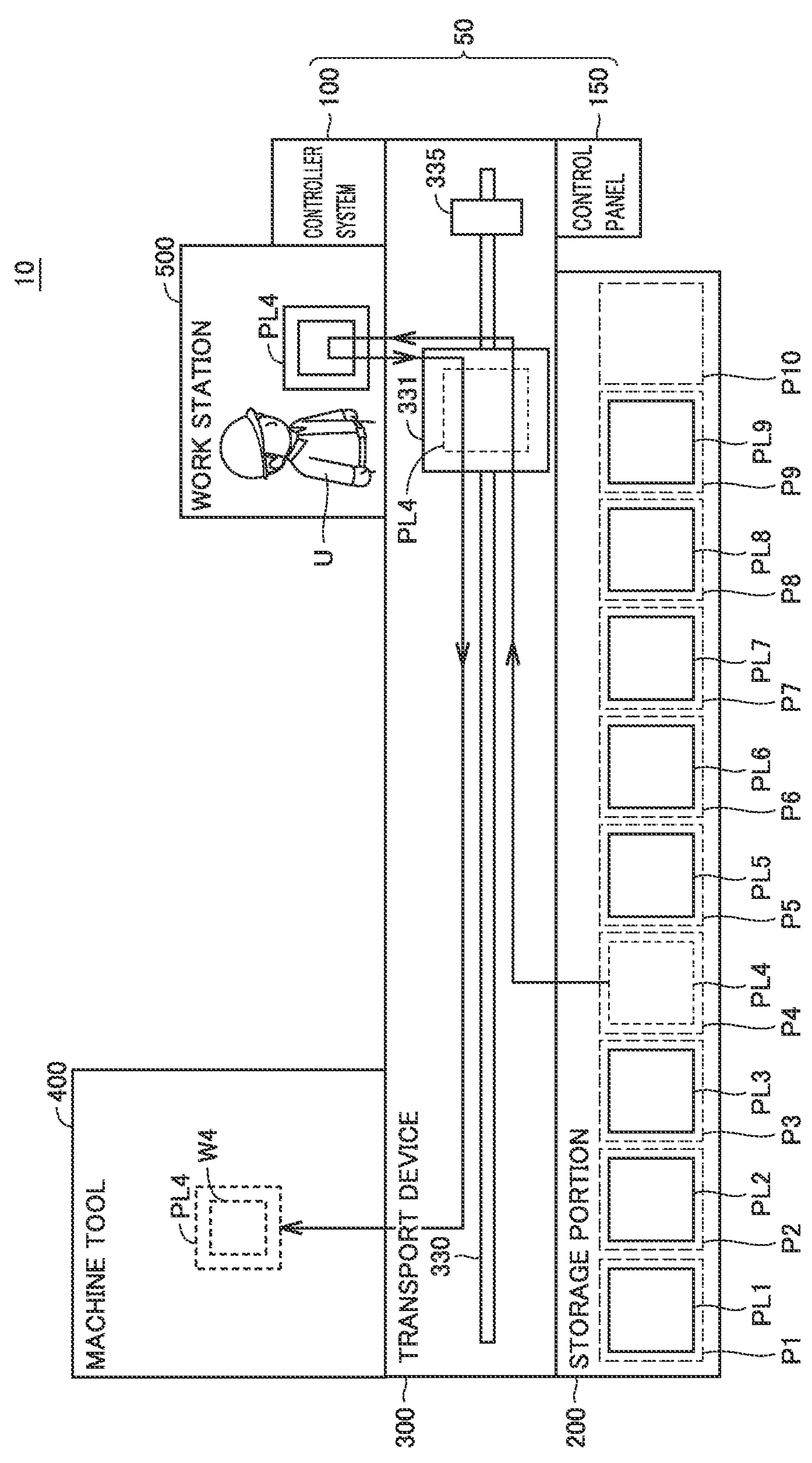
FIG. 7 is a diagram showing one example of a transport process of a workpiece from a storage to a machine tool.

Next, function of transport controlling section 156 shown in FIG. 3 is described. First, referring to FIG. 7, a transport process of the first workpiece WA defined in machining schedule 125 is described. FIG. 7 is a diagram showing one example of a transport process of a workpiece from storage 200 to machine tool 400.

Transport controlling section 156 recognizes workpiece WA as the first object to be machined by referring to machining schedule 125 described above. On the basis of this, transport controlling section 156 starts transport of a vacant pallet from storage 200 to work station 500. The pallet to be transported at this time may be determined randomly from among vacant pallets, or may be determined from preliminarily designated pallets. In the example of FIG. 7, storage 200 has storage locations P1 to P10 for pallets, and vacant pallet PL4 is determined as an object to be transported.

Next, the worker attaches workpiece WA to pallet PL4. Upon completion of the attaching operation of workpiece WA, the worker performs a transport starting operation of pallet PL4. As one example, the transport starting operation is realized by pressing down of a transport start button provided in work station 500.

When machine tool 400 is not machining, transport controlling section 156 transports pallet PL4 to which workpiece WA is attached to machine tool 400. Upon completion of transport of pallet PL4 to machine tool 400, machine tool 400 starts machining of workpiece WA.

Figure 8:
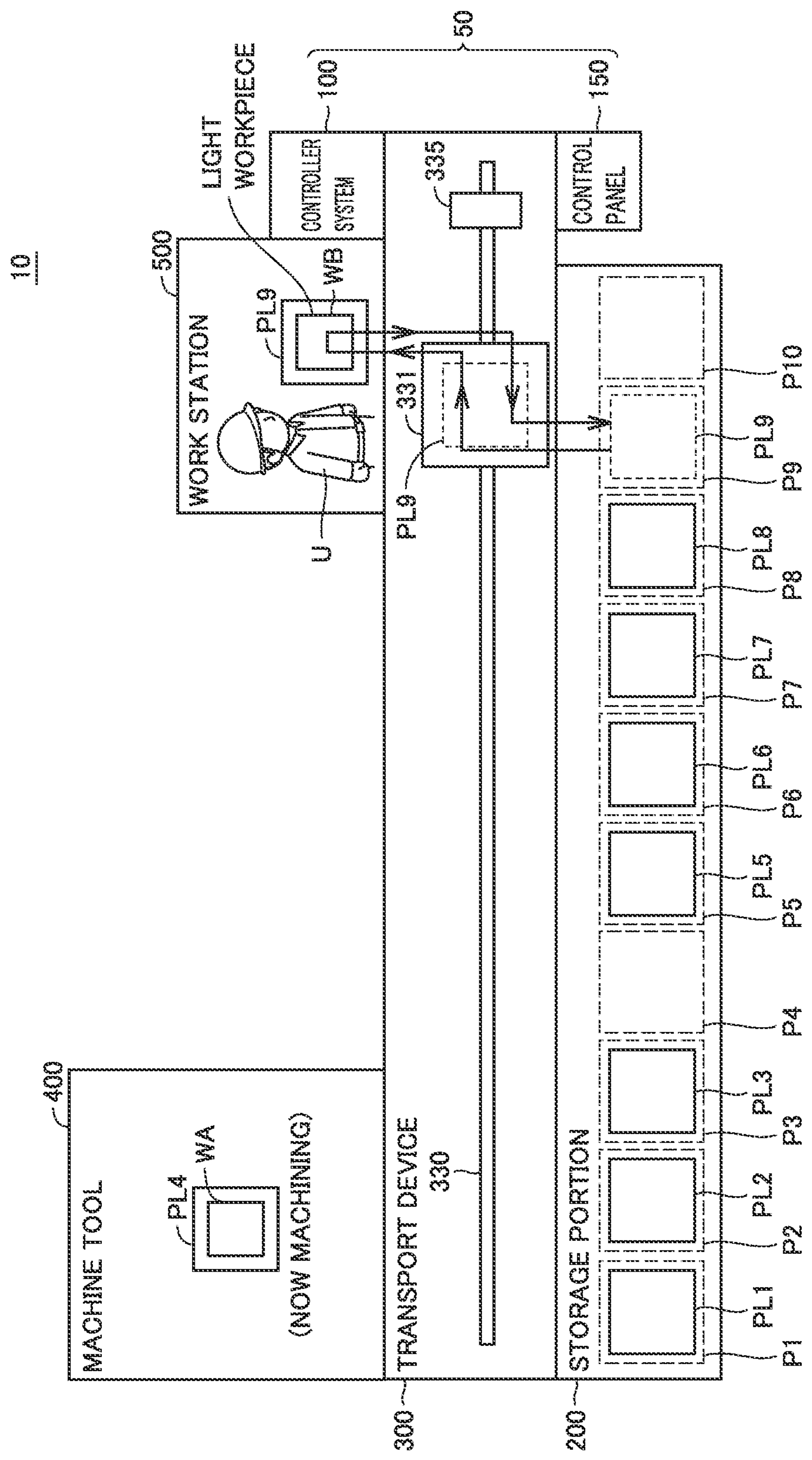
FIG. 8 is a diagram showing a transport process of a workpiece from a work station to the storage when the weight of the workpiece is light.
Figure 10:
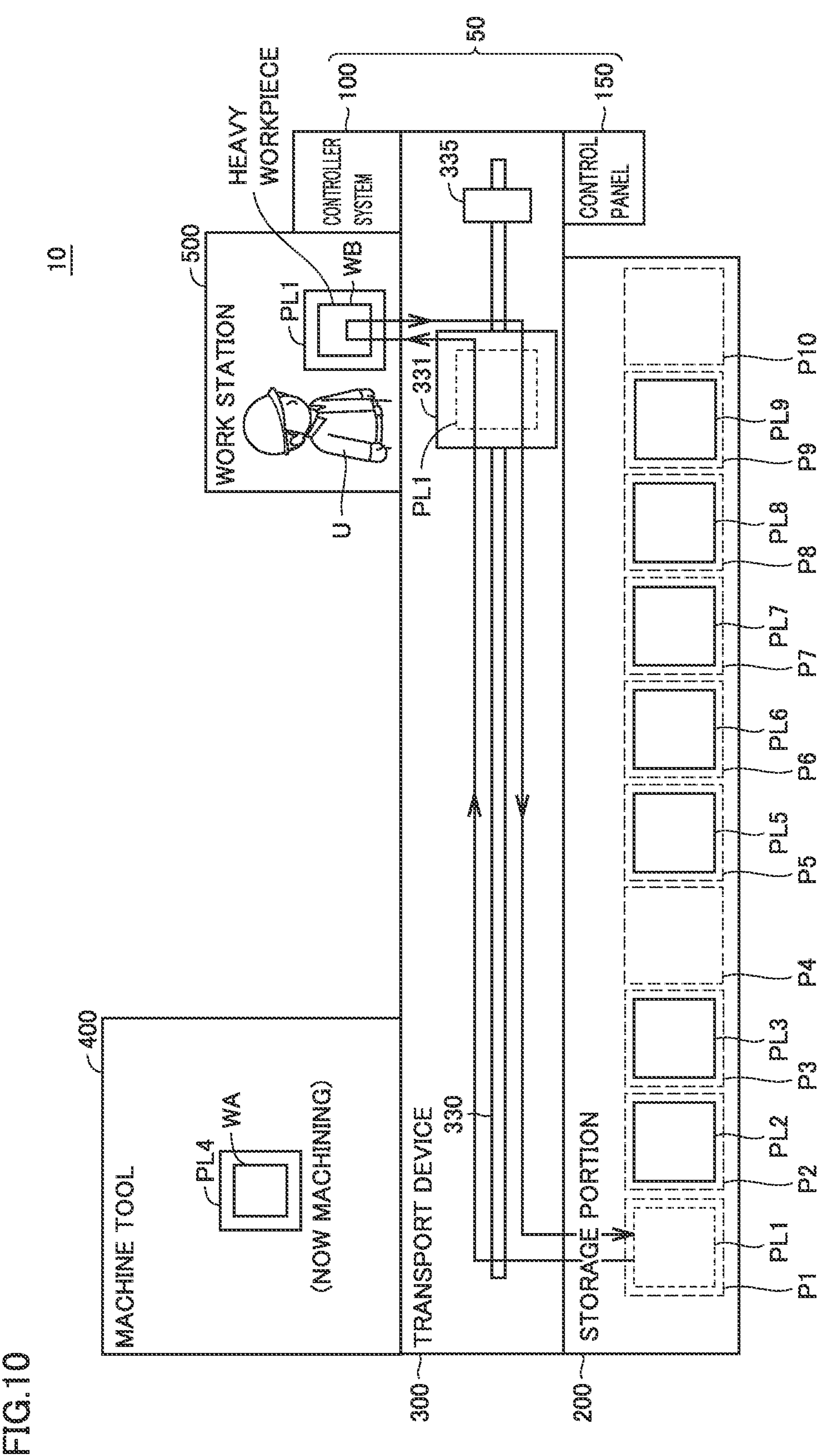
FIG. 10 is a diagram showing a transport process of a workpiece from the work station to the storage when the weight of the workpiece is heavy.

Next, referring to FIG. 8 to FIG. 10, a transport process of the second workpiece WB defined in machining schedule 125 is described. FIG. 8 is a diagram showing a transport process of workpiece WB from work station 500 to storage 200 when the weight of workpiece WB is light.

On the basis of completion of transport of workpiece WA which is the first object to be machined, transport controlling section 156 recognizes workpiece WB as the second object to be machined by referring to machining schedule 125 described above. At this time, since machine tool 400 is machining workpiece WA, transport controlling section 156 needs to temporarily store workpiece WB in storage 200 until machine tool 400 is vacated. In this case, transport controlling section 156 acquires weight of workpiece WB (first weight) from workpiece information 124 (see FIG. 5) described above, and determines a storage destination of workpiece WB based on the weight. At this time, the storage destination is determined so as to be closer to machine tool 400 as the weight of workpiece WB increases.

As one example, transport controlling section 156 determines a storage destination of workpiece WB based on storage location information 126 shown in FIG. 9. FIG. 9 is a chart showing one example of data structure of storage location information 126.

Storage location information 126 defines, for each storage location of storage 200, weight range of workpiece, coordinate values of the storage location, presence or absence of pallet or identification information of pallet in the storage location, presence or absence of workpiece or identification information of workpiece in the storage location, and so on.

As the storage location approximates to machine tool 400, the associated weight range is heavier. As one example, storage location P1 is associated with weight range Δw1.

Storage location P2 is associated with weight range Δw2. The upper limit value of weight range Δw2 is smaller than the lower limit value of weight range Δw1.

Storage location P3 is associated with weight range Δw3. The upper limit value of weight range Δw3 is smaller than the lower limit value of weight range Δw2.

Storage location P4 is associated with weight range Δw4. The upper limit value of weight range Δw4 is smaller than the lower limit value of weight range Δw3.

Storage location P5 is associated with weight range Δw5. The upper limit value of weight range Δw5 is smaller than the lower limit value of weight range Δw4.

Storage location P6 is associated with weight range Δw6. The upper limit value of weight range Δw6 is smaller than the lower limit value of weight range Δw5.

Storage location P7 is associated with weight range Δw7. The upper limit value of weight range Δw7 is smaller than the lower limit value of weight range Δw6.

Storage location P8 is associated with weight range Δw8. The upper limit value of weight range Δw8 is smaller than the lower limit value of weight range Δw7.

Storage location P9 is associated with weight range Δw9. The upper limit value of weight range Δw9 is smaller than the lower limit value of weight range Δw8.

As one example, weight range Δw10 is associated with storage location P10. The upper limit value of weight range Δw10 is smaller than the lower limit value of weight range Δw9.

Transport controlling section 156 specifies the weight range to which the weight of workpiece WB belongs by referring to storage location information 126, and determines the storage location associated with the weight range as a storage destination of workpiece WB. In the example of FIG. 8, for light workpiece WB, storage location P9 is determined as a storage destination.

Next, transport controlling section 156 transports vacant pallet PL9 located in storage location P9 from storage 200 to work station 500. Thereafter, the worker attaches workpiece WB to pallet PL9. Upon completion of the attaching operation of workpiece WB, the worker performs a transport starting operation of pallet PL9. Thereafter, transport controlling section 156 transports pallet PL9 from work station

500 to storage location PL9. As a result, light workpiece WB is stored in storage location P9 that is far from machine tool 400.

FIG. 10 is a diagram showing a transport process of workpiece WB from work station 500 to storage 200 when the weight of workpiece WB is heavy.

In the same manner as described above, transport controlling section 156 specifies the weight range to which the weight of workpiece WB belongs by referring to storage location information 126, and determines the storage location associated with the weight range as a storage destination of workpiece WB. In the example of FIG. 10, for heavy workpiece WB, storage location P1 is determined as a storage destination.

Next, transport controlling section 156 transports vacant pallet PL1 located in storage location P1 from storage 200 to work station 500. Thereafter, the worker attaches workpiece WB to pallet PL1. Upon completion of the attaching operation of workpiece WB, the worker performs a transport starting operation of pallet PL1. Thereafter, transport controlling section 156 transports pallet PL1 from work station 500 to storage location PL1. As a result, heavy workpiece WB is stored in storage location P1 that is close to machine tool 400.

Figure 11:
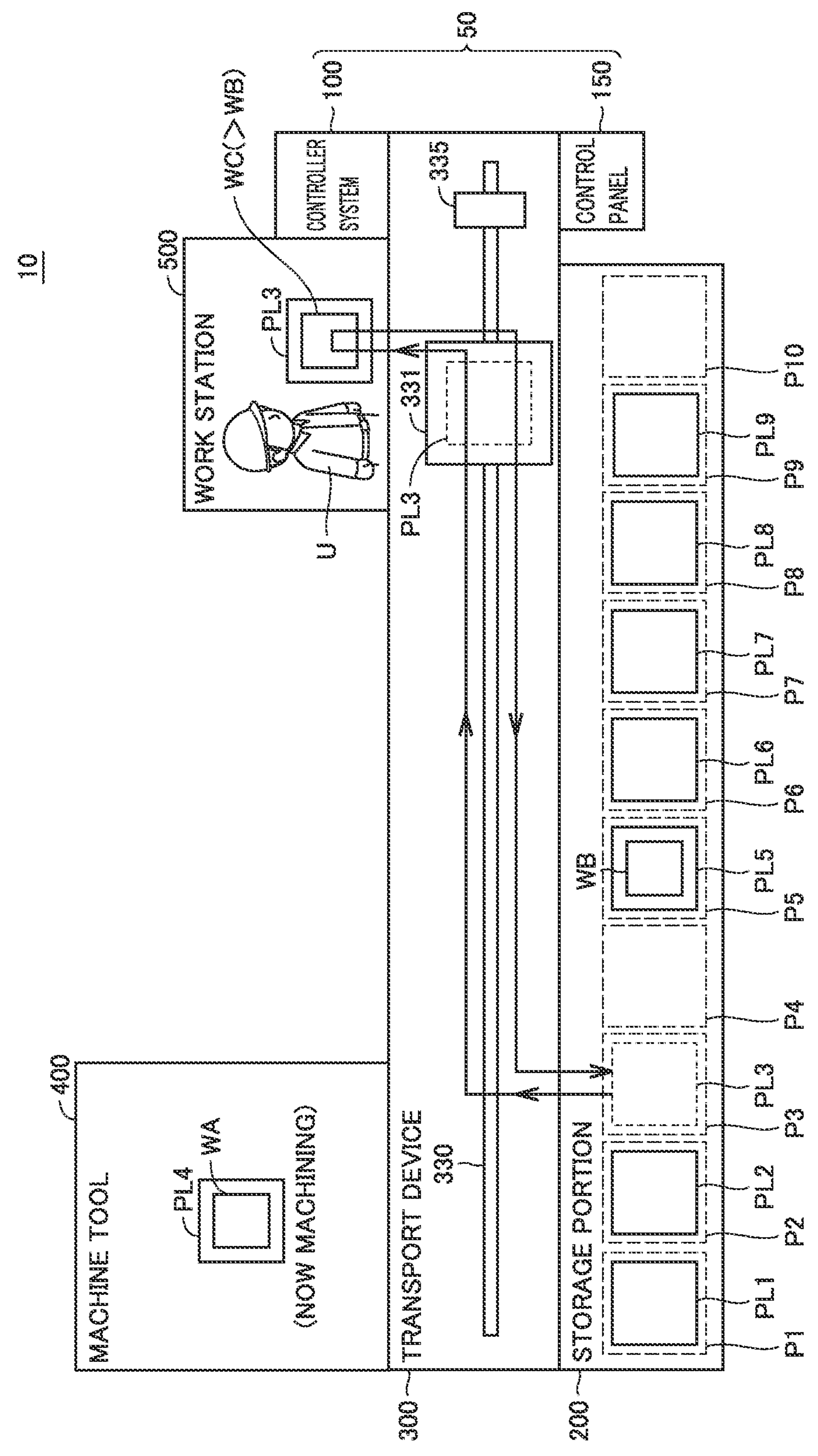
FIG. 11 is a diagram showing a transport process of a workpiece to be transported from the work station to the storage when the weight of the workpiece to be transported is lighter than the weight of a stored workpiece.
Figure 12:
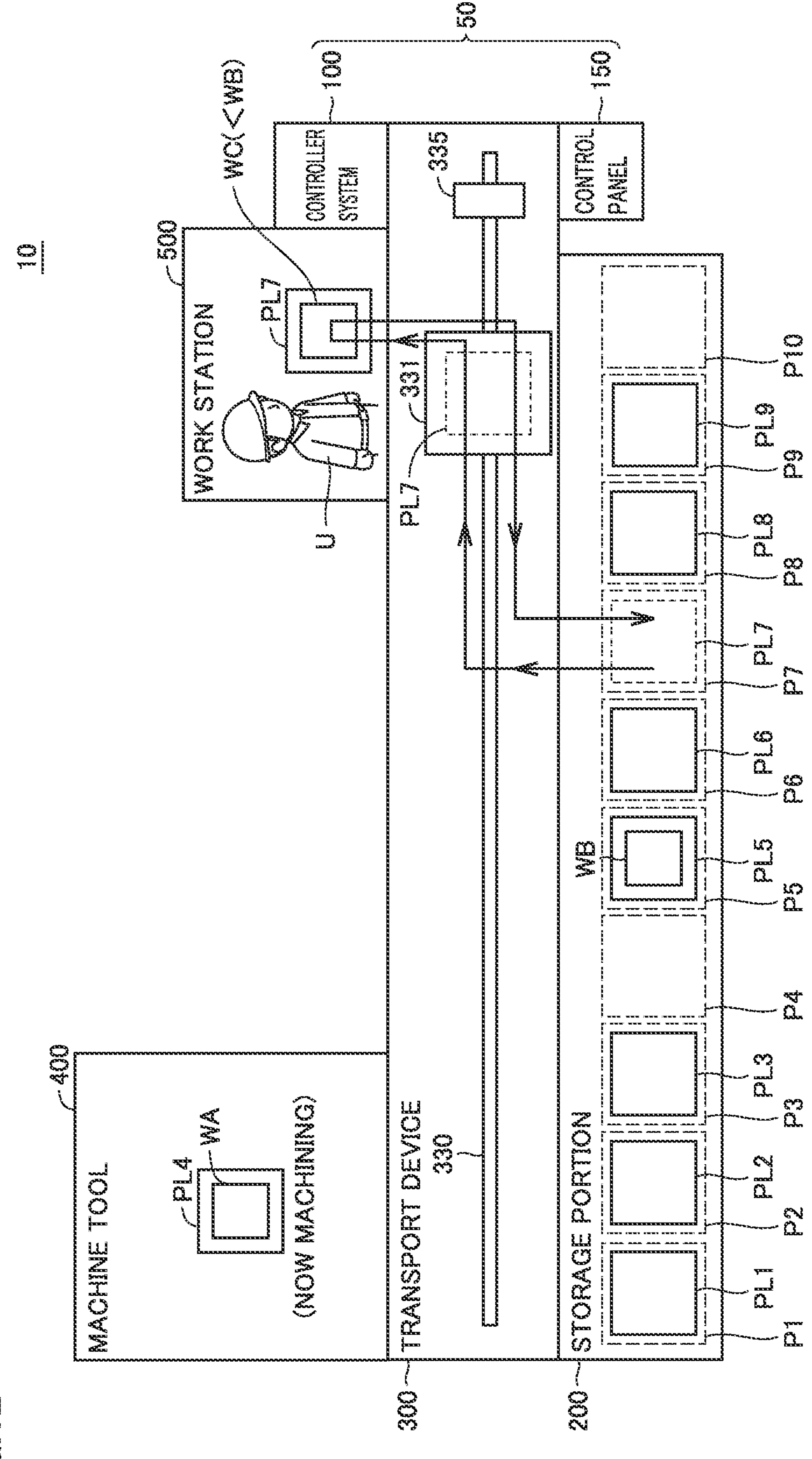
FIG. 12 is a diagram showing a transport process of a workpiece to be transported from the work station to the storage when the weight of the workpiece to be transported is heavier than the weight of the stored workpiece.

Next, referring to FIG. 11 and FIG. 12, a transport process of the third workpiece WC defined in machining schedule 125 is described. FIG. 11 is a diagram showing a transport process of workpiece WC from work station 500 to storage 200 when the weight of workpiece WC is lighter than the weight of workpiece WB.

On the basis of completion of transport of workpiece WB which is the second object to be machined, transport controlling section 156 recognizes workpiece WC as the third object to be machined by referring to machining schedule 125 described above. At this time, since machine tool 400 is machining workpiece WA, transport controlling section 156 needs to temporarily store workpiece WC in storage 200 until machine tool 400 is vacated. In this case, transport controlling section 156 acquires weight of workpiece WC from workpiece information 124 described above, and determines a storage destination of workpiece WC based on the weight.

As shown in FIG. 11, when one or more workpieces have been already stored in storage 200, transport controlling section 156 determines a storage destination of workpiece WC on the basis of the weight of the stored workpiece. In the following, a transport process for workpiece WC is described on the assumption that workpiece WB is stored in storage location P5.

Transport controlling section 156 acquires weight of stored workpiece WB and acquires weight of workpiece WC to be transported by referring to workpiece information 124 described above. Thereafter, transport controlling section 156 determines a storage location of workpiece WC by comparing the weight of stored workpiece WB and the weight of workpiece WC to be transported.

As shown in FIG. 11, when the weight of workpiece WC to be transported (first weight) is lighter than the weight of stored workpiece WB (second weight), transport controlling section 156 determines a storage destination of workpiece WC so as to be farther from machine tool 400 than storage location P5 of workpiece WB. In this case, the storage destination of workpiece WC is determined from among storage locations P6 to P10 that are farther from machine tool 400 than storage location P5 of workpiece WB.

FIG. 12 is a diagram showing a transport process of workpiece WC from work station 500 to storage 200 when the weight of workpiece WC is heavier than the weight of workpiece WB. As shown in FIG. 12, when the weight of workpiece WC to be transported (first weight) is heavier than the weight of stored workpiece WB (second weight), transport controlling section 156 determines a storage destination of workpiece WC so as to be closer to machine tool 400 than storage location P5 of workpiece WB. In this case, the storage destination of workpiece WC is determined from among storage locations P1 to P4 that are closer to machine tool 400 than storage location P5 of workpiece WB.

As shown in examples of FIG. 11 and FIG. 12, a storage destination of a workpiece to be transported is not necessarily determined based on the relationship between storage location of workpiece and weight of workpiece, and may be determined on the basis of the weight of the workpiece stored in storage 200. As a result, it becomes no longer necessary to preliminarily define the relationship between storage location of workpiece and weight of workpiece, resulting that transport controlling section 156 can transport workpiece flexibly and efficiently.

In the above description, the case of determining a storage destination of a workpiece to be transported before transportation of workpiece from storage 200 to work station 500 has been described, the storage destination may be determined in any timing. As one example, the storage destination may be determined after completion of the attaching operation of workpiece in work station 500. In this case, weight of workpiece is not necessarily defined preliminarily.

E. Data Sharing Method

Figure 13:
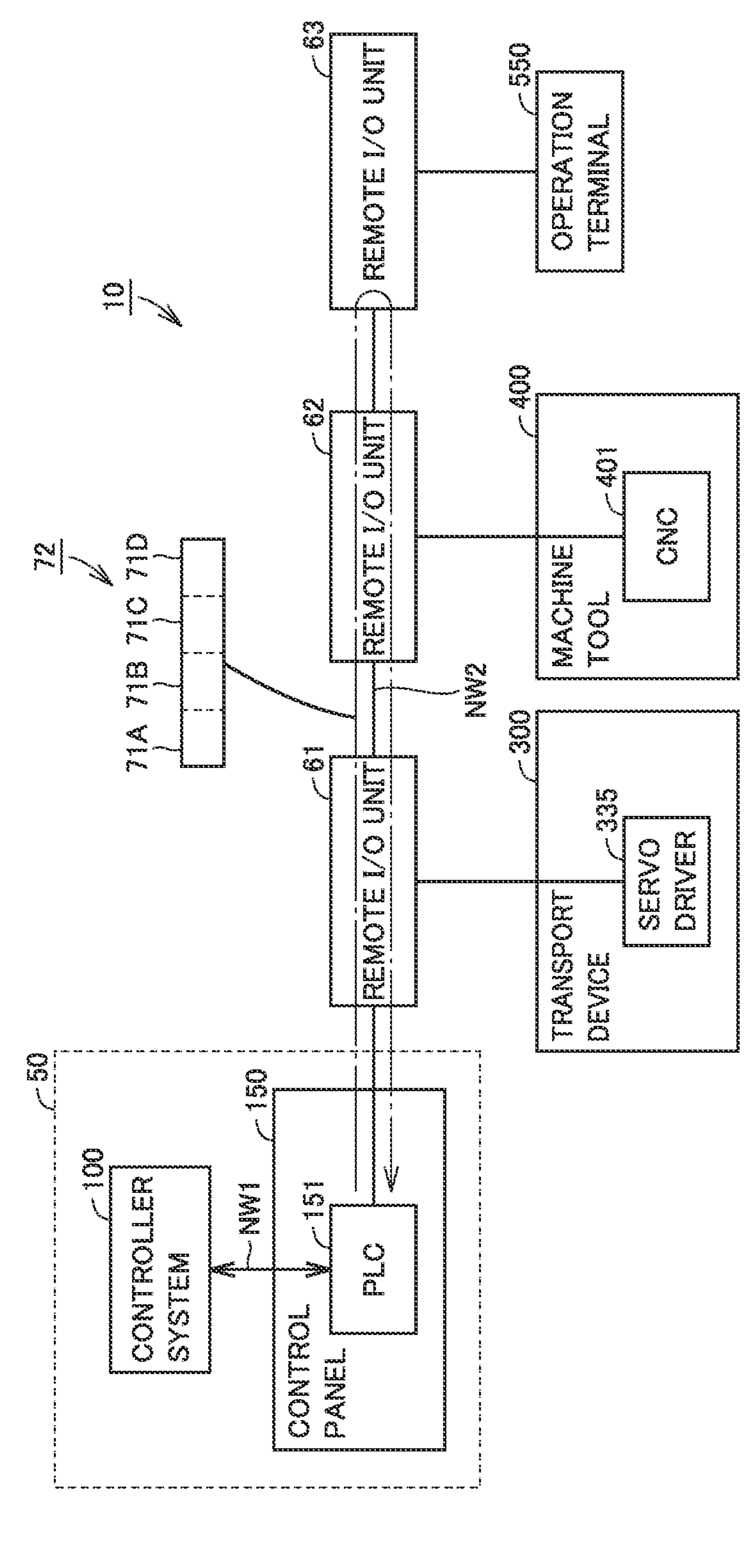
FIG. 13 is a conceptual diagram schematically showing cooperative relationships among various apparatuses constituting the transport system.

Referring to FIG. 13, a method for sharing data among apparatuses constituting transport system 10 is described. FIG. 13 is a conceptual diagram schematically showing cooperative relationships among various apparatuses constituting the transport system 10.

As described above, control system 100 and PLC 151 are connected to a network NW1 such as EtherNET. Remote I/O units 61 to 63 and PLC 151 are connected to network NW2 which is a field network.

A frame 72 is transmitted to network NW2. Frame 72 circles on network NW2 every predetermined control cycle. Remote I/O units 61 to 63 and PLC 151 share various data via frame 72.

Frame 72 has, for example, a data area 71A for PLC 151, a data area 71B for transport device 300 to be connected to remote I/O unit 61, a data area 71C for machine tool 400 to be connected to remote I/O unit 62, and a data area 71D for operation terminal 550 to be connected to remote I/O unit 63.

Data area 71A of frame 72 is an area for PLC 151 to write various data in. In data area 71A, a transport instruction of pallet PL or the like is to be written. The transport instruction contains a transport destination of pallet PL. The transport destination is indicated, for example, by an identification number indicating a storage location in pallet storage 200 (for example, ID (Identification) indicating a storage location), or by an identification number for identifying machine tool 400 (for example, ID of machine tool) and the like. Various data written into data area 71A by PLC 151 can be referenced by various apparatuses connected to network NW2.

Data area 71B of frame 72 is an area for remote I/O unit 61 to write various data concerning transport device 300 in. Various data written into data area 71B is referenced by various apparatuses connected to network NW2.

Data area 71C of frame 72 is an area for remote I/O unit 62 to write various data concerning machine tool 400 in. Various data written into data area 71C is referenced by various apparatuses connected to network NW2.

Data area 71D of frame 72 is, for example, an area for remote I/O unit 63 to write an operation content for operation terminal 550 in. As one example, in data area 71D of frame 72, a selection result of acceptance or rejection for transportation of pallet from work station 500 or the like is to be written.

F. Hardware Configuration of Control System 100

Figure 14:
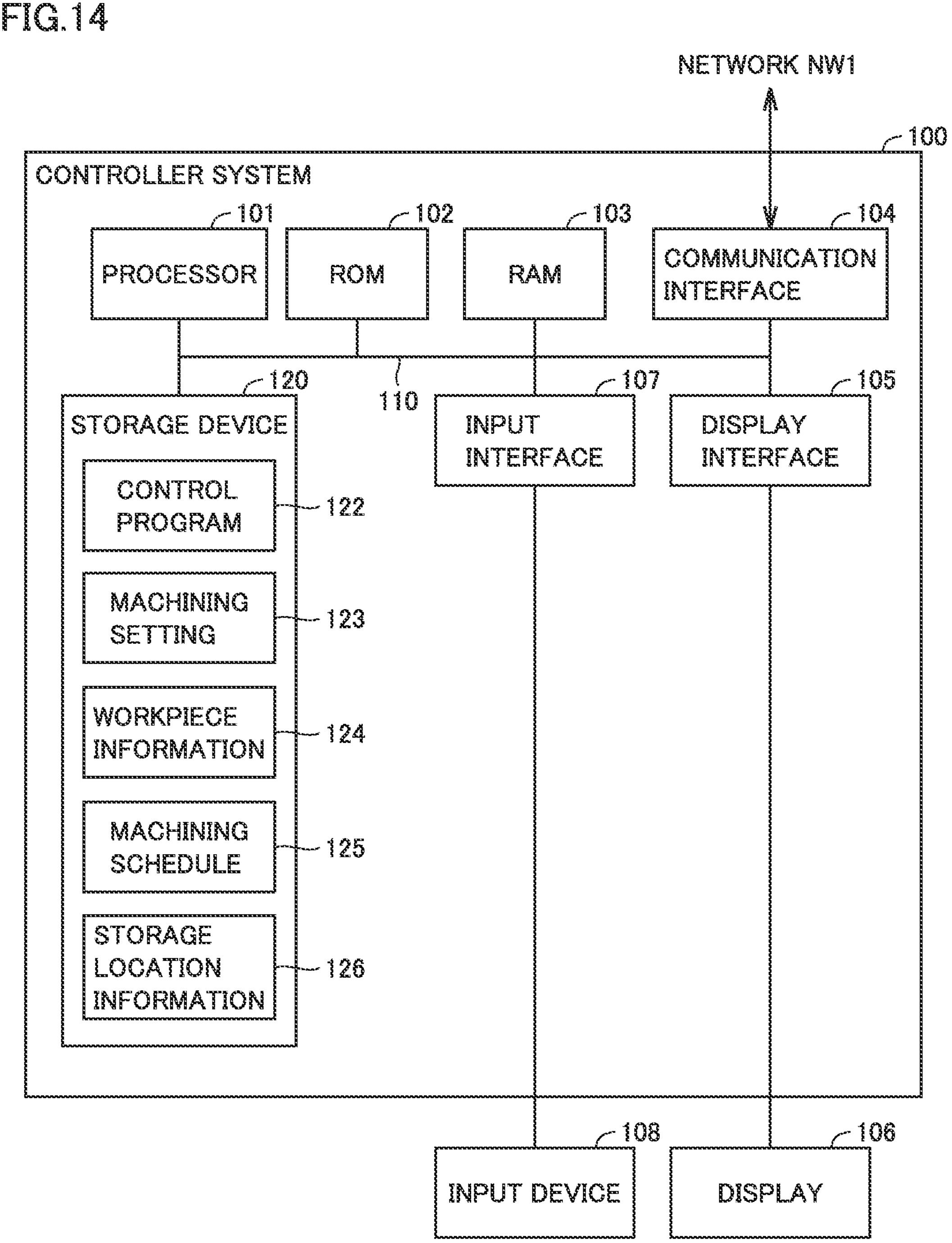
FIG. 14 is a diagram showing one example of hardware configuration of a control system.

Referring to FIG. 14, hardware configuration of control system 100 is described. FIG. 14 is a diagram showing one example of hardware configuration of control system 100.

Control system 100 includes a processor 101, a ROM (Read Only Memory) 102, a RAM (Random Access Memory) 103, a communication interface 104, a display interface 105, an input interface 107, and a storage device 120. These components are connected to a bus 110.

Processor 101 is configured, for example, by at least one integrated circuit. The integrated circuit can be configured by, for example, at least one CPU (Central Processing Unit), at least one GPU (Graphics Processing Unit), at least one ASIC (Application Specific Integrated Circuit), at least one FPGA (Field Programmable Gate Array), or combination thereof and the like.

Processor 101 controls operations of control system 100 by executing a control program 122 and various programs of an operating system or the like. Control program 122 is a program regarding transport control of workpiece. Processor 101 reads out control program 122 from storage device 120 or ROM 102 into RAM 103 on the basis of reception of a command for executing control program 122. RAM 103 functions as working memory, and temporarily stores various data required for executing control program 122.

To communication interface 104, LAN (Local Area Network), antenna and the like are connected. Control system 100 is connected to network NW1 via communication interface 104. Thus, control system 100 exchanges data with an external device connected to network NW1. The external device includes, for example, control panel 150, a server (not shown) and the like. Control system 100 may be configured to be capable of downloading control program 122 from the external device.

To display interface 105, a display 106 is connected. Display interface 105 transmits an image signal for displaying an image to display 106 based on a command from processor 101 or the like. Display 106 is, for example, a liquid crystal display, an inorganic EL (Electro Luminescence) display, or other display device. Display 106 may be configured integrally with control system 100, and may be configured separately from control system 100.

To input interface 107, an input device 108 is connected. Input device 108 is, for example, a mouse, a keyboard, a touch panel, or other device capable of receiving an operation by a user. Input device 108 may be configured integrally with control system 100, and may be configured separately from control system 100.

Storage device 120 is, for example, a storage medium such as hard disc or flush memory. Storage device 120 stores control program 122, machining setting 123 described above, workpiece information 124 described above, machining schedule 125 described above, and storage location information 126 described above and so on. The storage location of various data stored in storage device 120 is not limited to storage device 120, and the data may be stored in a storage area of processor 101 (for example, cash memory and the like), ROM 102, RAM 103, external device (for example, PLC 151 or an external server) and the like.

Control program 122 may be provided as a part of a desired program to which it is incorporated rather than as a single program. In this case, the transport control processing by control program 122 is realized in cooperation with the desired program. Such a program without some module does not apart from the scope of control program 122 based on the present embodiment. Further, part or all of the functions provided by control program 122 may be realized by dedicated hardware. Further, control system 100 may be configured in a form of a so-called cloud service in which at least one server executes part of the processing of control program 122.

G. Hardware Configuration of PLC 151'

Figure 15:
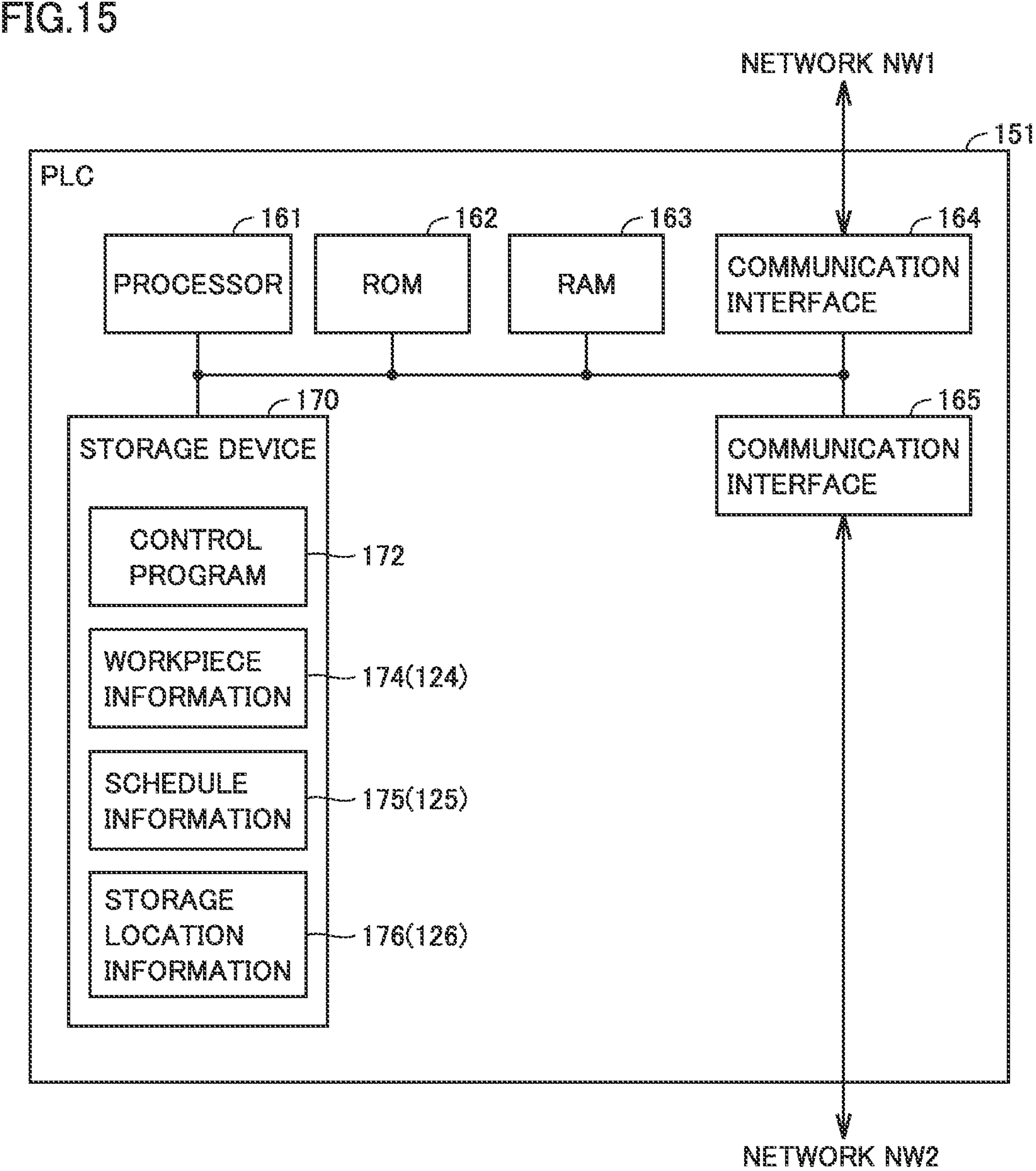
FIG. 15 is a block diagram showing principal hardware configuration of PLC (Programmable Logic Controller).

Referring to FIG. 15, one example of hardware configuration of PLC 151 is described. FIG. 15 is a block diagram showing a principal hardware configuration of PLC 151.

PLC 151 includes a processor 161, a ROM (Read Only Memory) 162, a RAM (Random Access Memory) 163, communication interfaces 164, 165, and a storage device 170.

Processor 161 is configured by at least one integrated circuit. The integrated circuit is configured, for example, by at least one CPU, at least one MPU (Micro Processing Unit), at least one ASIC, at least one FPGA or combination thereof or the like.

Processor 161 controls operations of transport device 300, machine tool 400 and the like by executing various programs such as a control program 172. Processor 161 reads out control program 172 from storage device 170 into ROM 162 on the basis of reception of a command for executing control program 172. RAM 163 functions as working memory, and temporarily stores various data required for executing control program 172.

To communication interface 164, LAN, an antenna and the like are connected. PLC 151 is connected to network NW1 via communication interface 164. Thus, PLC 151 exchanges data with an external device connected to network NW1. The external device includes, for example, control system 100, a server (not shown) and the like.

Communication interface 165 is an interface for connecting to network NW2 which is a filed network. PLC 151 exchanges data with an external device connected to network NW2 via communication interface 165. The external device includes, for example, remote I/O units 61 to 63.

Storage device 170 is, for example, a storage medium such as hard disc or flush memory. Storage device 170 stores a control program 172, workpiece information 174, a machining schedule 175, and storage location information 176 and so on. Workpiece information 174 corresponds to workpiece information 124 received from control system 100 described above. Machining schedule 175 corresponds to machining schedule 125 received from control system 100 described above. Storage location information 176 corresponds to storage location information 126 received from control system 100 described above. The storage location of various data stored in storage device 170 is not limited to storage device 170, and the data may be stored in a storage area of processor 161 (for example, cash area and the like), ROM 162, RAM 163, external device (for example, server) and the like.

Control program 172 may be provided as a part of a desired program to which it is incorporated, rather than as a single program. In this case, the control processing based on the present embodiment is realized in cooperation with the desired program. Such a program without some module does not apart from the scope of control program 172 based on the present embodiment. Further, part or all of the functions provided by control program 172 may be realized by dedicated hardware. Further, PLC 151 may be configured in a form of a so-called cloud service in which at least one server executes part of the processing of control program 172.

H. Hardware Configuration of Machine Tool 400

Referring to FIG. 16, one example of hardware configuration of machine tool 400 is described. FIG. 16 is a block diagram showing a principal hardware configuration of machine tool 400.

Machine tool 400 includes a CNC 401, a ROM 402, a RAM 403, a field bus controller 404, a display interface 405, an input interface 409, servo drivers 411A to 411D, servo motors 412A to 412D, encoders 413A to 413D, ball screws 414A, 414B, and a main shaft 415 for attachment of a tool. These devices are connected via a bus (not shown).

CNC 401 is configured by at least one integrated circuit. The integrated circuit is configured, for example, by at least one CPU, at least one MPU, at least one ASIC, at least one FPGA or combination thereof or the like.

CNC 401 controls operation of CNC 400 by executing various programs such as a machining program 422. CNC 401 reads out machining program 422 from storage device 420 to ROM 402 on the basis of reception of a command for executing machining program 422. RAM 403 functions as working memory, and temporarily stores various data required for executing machining program 422.

Field bus controller 404 is an interface for realizing communication with PLC 151 via remote I/O unit 62. CNC 400 exchanges data with PLC 151 via field bus controller 404.

Display interface 405 is connected with a display device such as a display 430, and transmits an image signal for displaying an image to display 430 based on a command from CNC 401 or the like. Display 430 is, for example, a liquid crystal display, an inorganic EL display, or other display device.

Input interface 409 can be connected to an input device 431. Input device 431 is, for example, a mouse, a keyboard, a touch panel, or other input device capable of receiving a user operation.

CNC 400 controls servo driver 411A based on machining program 422. Servo driver 411A sequentially receives input of a target rotation rate (or target position) from CNC 401, and controls servo motor 412A so that servo motor 412A rotates at the target rotation rate to drive a workpiece setting pedestal (not shown) in an X-axial direction. More specifically, servo driver 411A calculates an actual rotation rate (or actual position) of servo motor 412A from a feedback signal of encoder 413A, and increases the rotation rate of servo motor 412A when the actual rotation rate is smaller than the target rotation rate, and decreases the rotation rate of servo motor 412A when the actual rotation rate is larger than the target rotation rate. In this manner, servo driver 411A approximates the rotation rate of servo motor 412A to the target rotation rate while sequentially receiving feedback of rotation rate of servo motor 412A. Servo driver 411A moves workpiece setting pedestal connected to ball screw 414A in the X-axial direction to move the workpiece setting pedestal to a desired position in the X-axial direction.

By the same motor control, servo driver 411B moves a workpiece setting pedestal connected to ball screw 414B in a Y-axial direction based on a control command from CNC 400 to move the workpiece setting pedestal to a desired position in the Y-axial direction. By performing the same motor control, servo driver 411C moves main shaft 415 in a Z-axial direction based on a control command from CNC 400 to move main shaft 415 to a desired position in the Z-axial direction. By performing the same motor control, servo driver 411D controls rotation speed of main shaft 415 based on a control command from CNC 400.

Storage device 420 is, for example, a storage medium such as hard disc or flush memory. Storage device 420 stores machining program 422 and the like. The storage location of machining program 422 is not limited to storage device 420, and these may be stored in a storage area of CNC 401 (for example, cash area and the like), ROM 402, RAM 403, an external device (for example, server) and the like.

I. Hardware Configuration of Operation Terminal 550

Figure 17:
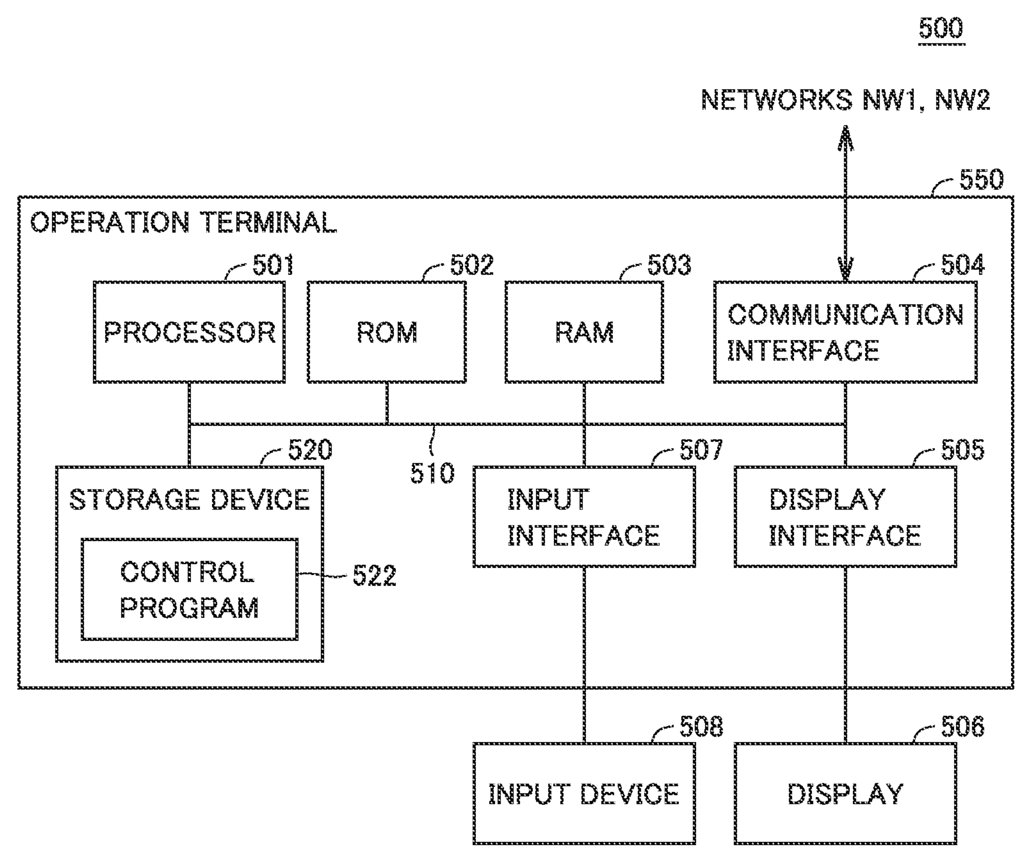
FIG. 17 is a diagram showing one example of hardware configuration of an operation terminal.

Referring to FIG. 17, hardware configuration of operation terminal 550 installed in work station 500 is described. FIG. 17 is a diagram showing one example of hardware configuration of operation terminal 550.

Operation terminal 550 includes a processor 501, a ROM 502, a RAM 503, a communication interface 504, a display interface 505, an input interface 507, and a storage device 520. These components are connected to a bus 510.

Processor 501 is configured, for example, by at least one integrated circuit. The integrated circuit can be configured, for example, by at least one CPU, at least one GPU, at least one ASIC, at least one FPGA or combination thereof or the like.

Processor 501 controls operations of operation terminal 550 by executing a control program 522 and various programs of an operating system or the like. Processor 501 reads out control program 522 from storage device 520 or ROM 502 into RAM 503 on the basis of reception of a command for executing control program 522. RAM 503 functions as working memory, and temporarily stores various data required for executing control program 522.

To communication interface 504, LAN, an antenna and the like are connected. Operation terminal 550 is connected to networks NW1, NW2 via communication interface 504. Thus, operation terminal 550 exchanges data with an external device connected to networks NW1, NW2. The external device includes, for example, control panel 150, a server (not shown) and the like. Operation terminal 550 may be configured to be capable of downloading control program 522 from the external device.

To display interface 505, a display 506 is connected. Display interface 505 transmits an image signal for displaying an image to display 506 based on a command from processor 501 or the like. In display 506, a selection screen that receives acceptance or rejection of forced transportation of a pallet at work located in work station 500 and the like is displayed. Display 506 is, for example, a liquid crystal display, an inorganic EL display, or other display device. Display 506 may be configured integrally with operation terminal 550, and may be configured separately from operation terminal 550.

To input interface 507, an input device 508 is connected. Input device 508 is, for example, a mouse, a keyboard, a touch panel, or other device capable of receiving an operation by a user. Input device 508 may be configured integrally with operation terminal 550, and may be configured separately from operation terminal 550.

Storage device 520 is, for example, a storage medium such as hard disc or flush memory. Storage device 520 stores control program 522 and the like. The storage location of control program 522 or the like is not limited to storage device 520, and these may be stored in a storage area of processor 501 (for example, cash memory and the like), ROM 502, RAM 503, an external device (for example, server) and the like.

Control program 522 may be provided as a part of a desired program to which it is incorporated, rather than as a single program. In this case, the control processing by control program 522 is realized in cooperation with the desired program. Such a program without some module does not apart from the scope of control program 522 based on the present embodiment. Further, part or all of the functions provided by control program 522 may be realized by dedicated hardware. Further, operation terminal 550 may be configured in a form of a so-called cloud service in which at least one server executes part of the processing of control program 522.

J. Flowchart

Referring to FIG. 18, control flow of processor 161 of PLC 151 is described. FIG. 18 is a flowchart showing part of a transport processing executed by processor 161.

In step S110, processor 161 determines whether or not a carrying-in instruction of workpiece to work station 500 is received. The carrying-in instruction is issued, for example, by pressing down a carrying-in start button provided in work station 500. Processor 161 switches the control to step S112 when it determines that a carrying-in instruction of workpiece to work station 500 is received (YES in step S110). If it is not so (NO in step S110), processor 161 again executes the processing in step S110.

In step S112, processor 161 functions as acquiring section 154 (see FIG. 3) described above, and acquires weight of workpiece to be transported by referring to workpiece information 124 (see FIG. 5) described above.

In step S120, processor 161 determines whether or not other workpiece that is different from the workpiece to be transported is located in storage 200 by referring to storage location information 126 (see FIG. 9) described above. Processor 161 switches the control to step S124 when it determines that other stored workpiece is located in storage 200 (YES in step S120). If it is not so (NO in step S120), processor 161 switches the control to step S122.

In step S122, processor 161 functions as transport controlling section 156 (see FIG. 3) described above, and specifies a weight range to which the weight of workpiece acquired in step S112 based on storage location information 126. Then, processor 161 determines a storage location associated with the weight range as a storage destination of the workpiece to be transported. At this time, the storage destination is determined so as to be closer to machine tool 400 as the weight of the workpiece to be transported increases.

In step S124, processor 161 functions as transport controlling section 156 described above, and determines a storage destination of a workpiece to be transported on the basis of the weight of the workpiece stored in storage 200. More specifically, when the weight of the workpiece to be transported is lighter than the weight of the stored workpiece, a storage destination of the workpiece to be transported is farther from machine tool 400 than the position of the stored workpiece. On the other hand, when the weight of the workpiece to be transported is heavier than the weight of the stored workpiece, a storage destination of the workpiece to be transported is closer to machine tool 400 than the position of the stored workpiece. At this time, the storage destination is determined from storage locations of vacant pallets.

In step S126, processor 161 functions as transport controlling section 156 described above, and transports a vacant pallet located in the storage destination determined in step S122 or step S124 to work station 500.

In step S130, processor 161 determines whether or not a transport starting operation of pallet is received. The transport starting operation is received, for example, in operation terminal 550 described above. Processor 161 switches the control to step S140 when it determines that a transport starting operation of pallet is received (YES in step S130). If it is not so (NO in step S130), processor 161 again executes the processing in step S130.

In step S140, processor 161 determines whether or not machine tool 400 is not machining. Whether or not machine tool 400 is not machining is determined based on whether or not the machining program is being executed. Processor 161 switches the control to step S172 when it determines that machine tool 400 is not machining (YES in step S140). If it is not so (NO in step S140), processor 161 switches the control to step S150.

In step S150, processor 161 determines whether or not the time until the next machining starts is within a predetermined time. Whether the time until the next machining starts is within a predetermined time is determined, for example, based on machining schedule 125 described above. The length of the predetermined time may be preliminarily set, or may be set ad libitum by a user. Processor 161 switches the control to step S152 when it determines that the time until the next machining starts is within a predetermined time (YES in step S150). If it is not so (NO in step S150), processor 161 switches the control to step S160.

In step S152, processor 161 switches the operation mode of transport device 300 to a standby mode, and stops driving of transport device 300.

In step S160, processor 161 determines whether or not a pallet that requires a set-up operation is located in storage 200. Whether or not such a pallet is located in storage 200 is determined based on machining schedule 125 described above, and storage location information 126 described above. The set-up operation includes, for example, an operation of attaching a workpiece to be machined to the pallet, and an operation of removing a machined workpiece from the pallet. Processor 161 switches the control to step S174 when it determines that a pallet that requires set-up operation is located in storage 200 (YES in step S160). If it is not so (NO in step S160), processor 161 switches the control to step S152.

In step S170, processor 161 determines whether or not machine tool 400 is not machining. Whether or not machine tool 400 is not machining is determined based on whether or not the machining program is being executed. Processor 161 switches the control to step S172 when it determines that machine tool 400 is not machining (YES in step S170). If it is not so (NO in step S170), processor 161 returns the control to step S152.

In step S172, processor 161 functions as transport controlling section 156 described above, and transports the pallet to which a workpiece is attached in work station 500 to machine tool 400.

In step S174, processor 161 functions as transport controlling section 156 described above, and transports the pallet to which a workpiece is attached in work station 500 to a storage destination determined in step S122 or step S124. In this manner, processor 161 transports the workpiece to be transported to a storage destination while machine tool 400 machines a workpiece that is different from the workpiece to be transported. Processor 161 is capable of improving the transport efficiency of workpieces by transporting each workpiece to a storage destination depending on the weight by utilizing the waiting time of machining.

Transportation of workpiece from work station 500 to storage 200 is not necessarily performed while machine tool 400 is not machining.

In the above description, the case of determining a storage destination of a workpiece to be transported before transportation of pallet from storage 200 to work station 500 has been described, the storage destination may be determined in any timing. As one example, the storage destination may be determined after completion of the attaching operation of workpiece in work station 500.

K. Modified Example 1

Figure 19:
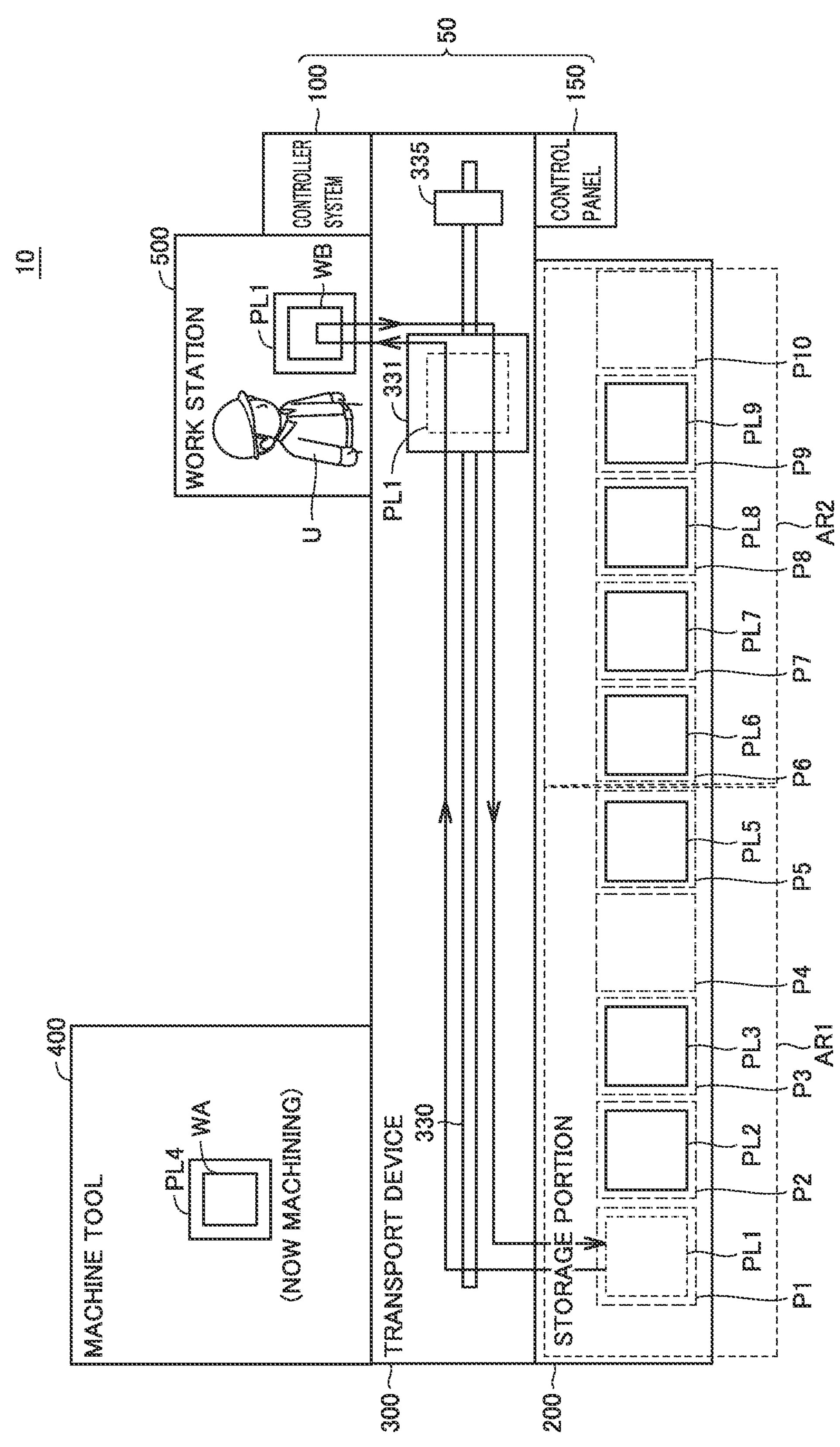
FIG. 19 is a diagram showing a transport process of a workpiece from the work station to a first storage area.
Figure 20:
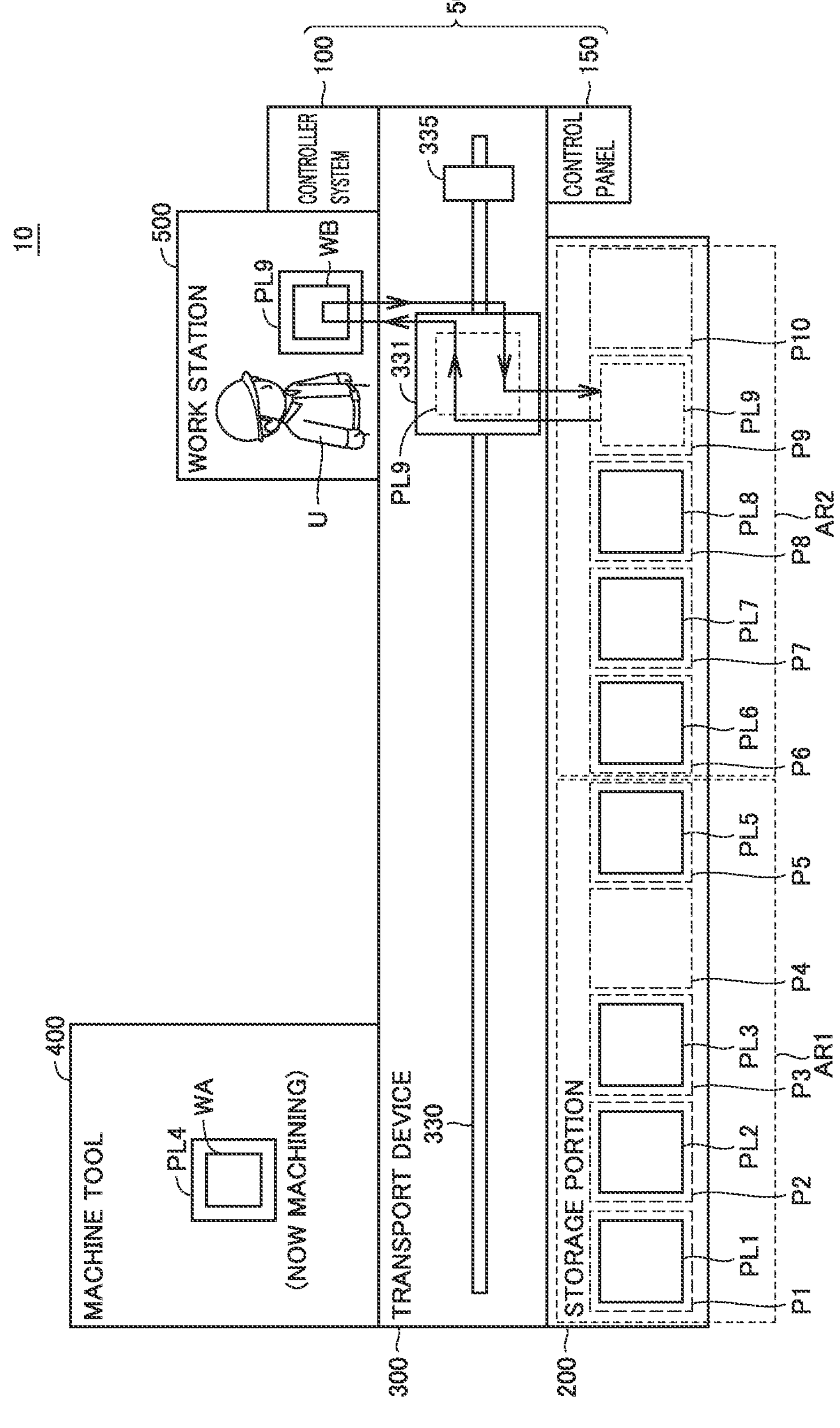
FIG. 20 is a diagram showing a transport process of a workpiece from the work station to a second storage area.

Next, referring to FIG. 19 and FIG. 20, Modified example 1 in a transport method of workpiece from work station 500 to storage 200 is described.

In the above-described examples of FIG. 8 to FIG. 10, a storage destination of a workpiece to be transported is uniquely determined based on storage location information 126. Also, in the above-described examples of FIG. 11 and FIG. 12, a storage destination of a workpiece in storage 200 is determined on the basis of the weight of the stored workpiece. In contrast to this, in the present modified example, storage location of storage 200 is preliminarily sectioned into a plurality of storage areas, and transport system 10 transports a workpiece to be transported to a storage area depending on the weight of the workpiece.

FIG. 19 is a diagram showing a transport process of workpiece WB from work station 500 to a storage area AR1. In the example of FIG. 19, storage 200 is sectioned into storage area AR1 (first storage area) and a storage area AR2 (second storage area). Storage area AR1 includes storage locations P1 to P5 for workpiece. Storage area AR2 includes storage locations P6 to P10 for workpiece. Storage area AR1 is closer to machine tool 400 than storage area AR2.

As shown in FIG. 19, controller 50 of transport system 10 determines a storage destination from within storage area AR1 that is still closer to machine tool 400 when the weight of workpiece WB to be transported is heavier than a predetermined weight. As one example, the storage destination is determined from vacant storage locations that are still closer to machine tool 400. Alternatively, the storage destination may be determined randomly from vacant storage locations of storage locations P1 to P5.

FIG. 20 is a diagram showing a transport process of workpiece WB from work station 500 to storage area AR2. As shown in FIG. 20, controller 50 of transport system 10 determines a storage destination from within storage area AR2 that is still farther from machine tool 400 when the weight of workpiece WB to be transported is lighter than the predetermined weight. As one example, the storage destination is determined from vacant storage locations that are distanced from machine tool 400. Alternatively, the storage destination may be determined randomly from vacant storage locations of storage locations P6 to P10.

By roughly dividing storage area of storage 200 depending on the weight of workpiece, the program design is simplified.

In FIG. 19 and FIG. 20, the case where storage 200 is sectioned into two storage areas AR1, AR2 has been described, however, the number of sections of storage 200 is not limited to two. Storage portion 200 may be sectioned into three or more storage areas.

The number of storage locations contained in each storage area is not necessarily identical. Further, the number of storage locations contained in each storage area may be fixed, or may be dynamically varied depending on the storage rate of workpiece in each storage area. As one example, transport system 10 may appropriately adjust the number of storage locations contained in each storage area so that difference in storage rate of workpiece in each storage area is minimum.

L. Modified Example 2

Figure 21:
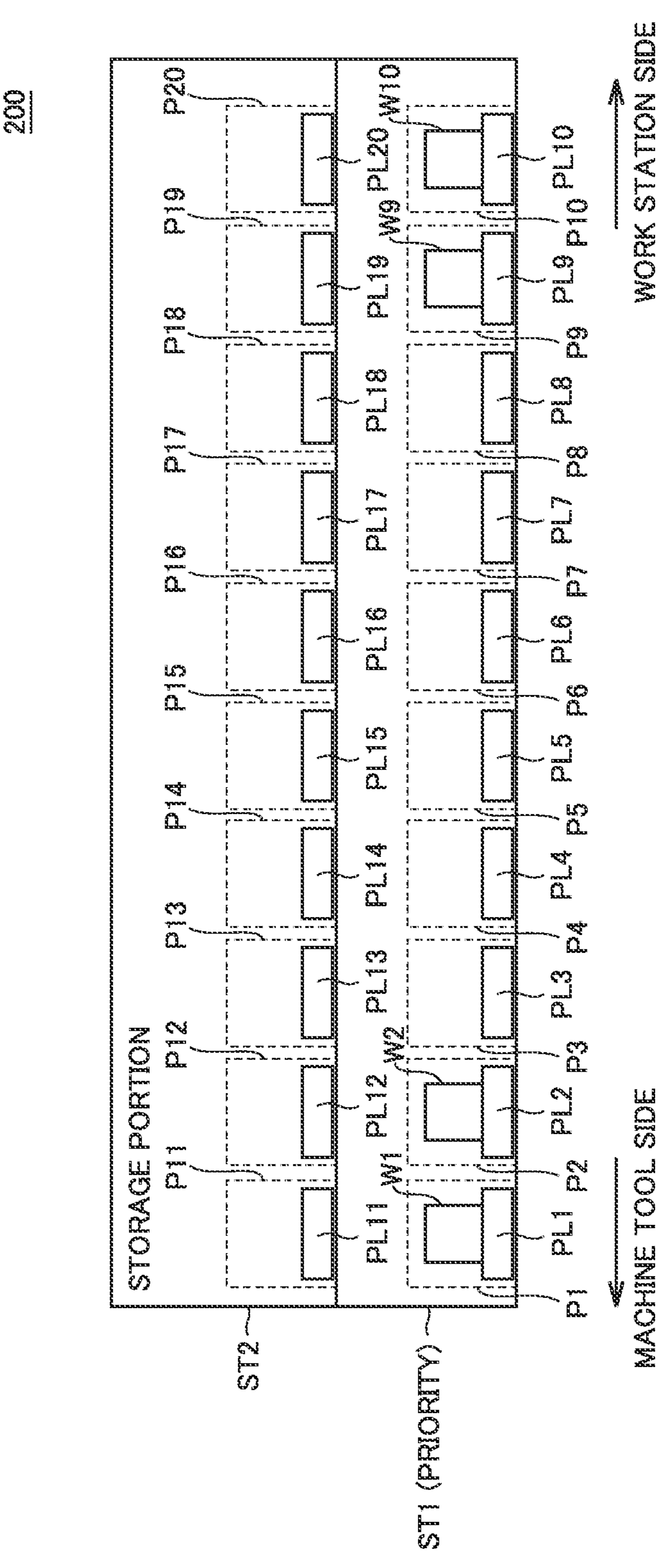
FIG. 21 is a view showing a storage based on a modified example.

Next, referring to FIG. 21, Modified example 2 in a transport method of workpiece from work station 500 to storage 200 is described.

In the above-described example of FIG. 1 or the like, storage 200 consists of one stage. In contrast to this, in the present modified example, storage 200 consists of two or more stages.

FIG. 21 is a view showing storage 200 based on a modified example. In the example of FIG. 21, storage 200 consists of two stages ST1, ST2. Stage ST2 (second stage) is an upper stage than stage ST1 (first stage).

Stage ST1 includes storage locations P1 to P10 for workpiece. Stage ST2 includes storage locations P11 to P20 for workpiece. A transport time of workpiece in the vertical direction (gravity direction) is longer than a transport time of workpiece in the horizontal direction. Therefore, when storage 200 consists of a plurality of stages, transport system 10 determines a storage destination of a workpiece to be transported sequentially from the lower stage of storage 200. That is, transport system 10 gives higher priority to the distance from machine tool 400 to storage location in the vertical direction over the distance from machine tool 400 to storage location in the horizontal direction as a basis for determination of storage destination.

More specifically, controller 50 of transport system 10 determines a storage destination from within stage ST1 based on the weight of the workpiece to be transported when there is vacancy in stage ST1. At this time, the storage destination is determined from within stage ST1 so as to be closer to machine tool 400 as the weight of the workpiece increases. A method for determining a storage destination within the same stage is as described above.

Meanwhile, controller 50 of transport system 10 determines a storage destination from within stage ST2 based on the weight of the workpiece to be transported when there is no vacancy in stage ST2. At this time, the storage destination is determined from within stage ST2 so as to be closer to machine tool 400 as the weight of the workpiece increases. A method for determining a storage destination within the same stage is as described above.

M. Modified Example 3

Next, Modified example 3 in a transport method of workpiece from work station 500 to storage 200 is described.

In the above-described example, the storage destination of a workpiece to be transported is determined based on the weight of the workpiece. In contrast to this, transport system 10 based on the present modified example is configured to be capable of receiving designation of a workpiece (hereinafter, "priority workpiece") having priority regarding machining order over other workpiece. Designation of priority workpiece is received, for example, in operation terminal 550 (operation panel) described above.

Upon reception of designation of priority workpiece, controller 50 of transport system 10 determines a storage destination inside storage 200 regardless of weight of the priority workpiece. At this time, controller 50 determines a storage location that is still closer to machine tool 400 among storage locations P1 to P10 inside storage 200 as a storage destination of the priority workpiece. As a result, transport system 10 is capable of reducing the transport time of priority workpiece.

It is to be understood that the embodiments disclosed herein are illustrative, but are not restrictive in every respect. The scope of the present invention is indicated by the appended claims rather than by the description described above, and it is intended that all modifications within the equivalent meaning and scope of the claims are included.

REFERENCE SIGNS LIST

10: transport system, 50: controller, 61 to 63: remote I/O unit, 71A to 71D: data area, 72: frame, 100: control system, 101, 161, 501: processor, 102, 162, 402, 502: ROM, 103, 163, 403, 503: RAM, 104, 164, 165, 504: communication interface, 105, 405, 505: display interface, 106, 430, 506: display, 107, 409, 507: input interface, 108, 431, 508: input device, 110, 510: bus, 120, 170, 420, 520: storage device, 122, 172, 522: control program, 123: machining setting, 124, 174: workpiece information, 125, 175: machining schedule, 126, 176: storage location information, 150: control panel, 152: schedule generating section, 154: acquiring section, 156: transport controlling section, 200: storage, 300: transport device, 330: rail, 331: carriage, 333: fork portion, 334, 411, 411A to 411D: servo driver, 335, 412, 412A to 412D: servo motor, 400: machine tool, 404: field bus controller, 413A to 413D: encoder, 414A, 414B: ball screw, 415: main shaft, 422: machining program, 500: work station, 550: operation terminal

The invention claimed is:

1. A transport system for a workpiece, comprising:

a transport device for transporting a workpiece to be machined;

a storage, which is one of transport destinations of workpiece by the transport device, capable of storing a plurality of workpieces;

a work station, which is one of transport destinations of workpiece by the transport device, for a worker to perform work for workpiece;

a machine tool, which is one of transport destinations of workpiece by the transport device, for machining a workpiece;

a controller for controlling the transport system; and an operation panel capable of receiving designation of a workpiece having priority regarding machining order over other workpiece, wherein the controller executing:

a processing of acquiring a first weight of a workpiece to be transported from the work station to the storage; and a processing of determining a storage destination inside the storage for the workpiece to be transported based on the first weight, the storage destination being determined so as to be closer to the machine tool as the first weight increases, the controller further executing:

a processing of determining a storage destination inside the storage regardless of weight of the workpiece having priority, when receiving the designation, the storage destination being a storage location that is still closer to the machine tool among storage locations inside the storage, the controller further executes a processing of acquiring a second weight of a workpiece stored in the storage, and in the processing of determining, when the first weight is heavier than the second weight, the storage destination is determined so as to be closer to the machine tool than the storage location of the stored workpiece, and when the first weight is lighter than the second weight, the storage destination is determined so as to be farther from the machine tool than the storage location of the stored workpiece.

2. The transport system according to claim 1, wherein the storage includes:

a first storage area; and a second storage area, the first storage area being closer to the machine tool than the second storage area, in the processing of determining, when the first weight is heavier than a predetermined weight, the storage destination is determined from within the first storage area, and when the first weight is lighter than the predetermined weight, the storage destination is determined from within the second storage area.

3. The transport system according to claim 1, wherein the storage includes:

a first stage; and a second stage that is an upper stage of the first stage, and in the processing of determining, when there is a vacancy in the first stage, the storage destination is determined from within the first stage based on the first weight, and when there is no vacancy in the first stage, the storage destination is determined from within the second stage based on the first weight.

4. The transport system according to claim 1, wherein the transport device transports the workpiece to be transported to the storage destination while the machine tool is machining other workpiece than the workpiece to be transported.

5. A control method of a transport system, the transport system comprising:

a transport device for transporting a workpiece to be machined;

a storage, which is one of transport destinations of workpiece by the transport device, capable of storing a plurality of workpieces;

a work station, which is one of transport destinations of workpiece by the transport device, for a worker to perform work for workpiece;

a machine tool, which is one of transport destinations of workpiece by the transport device, for machining a workpiece; and an operation panel capable of receiving designation of a workpiece having priority regarding machining order over other workpiece, the control method comprising:

acquiring weight of a workpiece to be transported from the work station to the storage; and determining a storage destination inside the storage for the workpiece to be transported based on the weight, the storage destination being determined so as to be closer to the machine tool as the weight increases, the control method further comprising:

executing a processing of determining a storage destination inside the storage regardless of weight of the workpiece having priority, when receiving the designation, the storage destination being a storage location that is still closer to the machine tool among storage locations inside the storage, the controller method further comprising:

acquiring a second weight of a workpiece stored in the storage in the determining, when the first weight is heavier than the second weight, the storage destination is determined so as to be closer to the machine tool than the storage location of the stored workpiece, and when the first weight is lighter than the second weight, the storage destination is determined so as to be farther from the machine tool than the storage location of the stored workpiece.

6. A non-transitory computer-readable medium comprising a control program of a transport system, the transport system comprising:

a transport device for transporting a workpiece to be machined;

a storage, which is one of transport destinations of workpiece by the transport device, capable of storing a plurality of workpieces;

a work station, which is one of transport destinations of workpiece by the transport device, for a worker to perform work for workpiece;

a machine tool, which is one of transport destinations of workpiece by the transport device, for machining a workpiece; and an operation panel capable of receiving designation of a workpiece having priority regarding machining order over other workpiece, the control program causing the transport system to execute:

acquiring weight of a workpiece to be transported from the work station to the storage; and determining a storage destination inside the storage for the workpiece to be transported based on the weight, the storage destination being determined so as to be closer to the machine tool as the weight increases, the control program further causing the transport system to execute:

a processing of determining a storage destination inside the storage regardless of weight of the workpiece having priority, when receiving the designation, the storage destination being a storage location that is still closer to the machine tool among storage locations inside the storage, the controller program further causing the transport system to execute:

acquiring a second weight of a workpiece stored in the storage, in the determining, when the first weight is heavier than the second weight, the storage destination is determined so as to be closer to the machine tool than the storage location of the stored workpiece, and when the first weight is lighter than the second weight, the storage destination is determined so as to be farther from the machine tool than the storage location of the stored workpiece.

* * * * *